US012763874B2

(12) United States Patent
Hu et al.

(10) Patent No.: US 12,763,874 B2
(45) Date of Patent: Oct. 13, 2026

(54) ENCODING METHOD, DECODING METHOD, AND RELATED APPARATUS

(71) Applicant: HUAWEI TECHNOLOGIES CO., LTD., Shenzhen (CN)

(72) Inventors: Mengshi Hu, Shenzhen (CN); Jian Yu, Shenzhen (CN); Ming Gan, Shenzhen (CN); Bo Gong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 252 days.

(21) Appl. No.: 18/604,182

(22) Filed: Mar. 13, 2024

(65) Prior Publication Data

US 2024/0235729 A1 Jul. 11, 2024

Related U.S. Application Data

(63) Continuation of application No. PCT/CN2022/116437, filed on Sep. 1, 2022.

(30) Foreign Application Priority Data

Sep. 15, 2021 (CN) ......................... 202111082976.4

(51) Int. Cl.
*H04L 1/00* (2006.01)

(52) U.S. Cl.
CPC .......... *H04L 1/0041* (2013.01); *H04L 1/0061* (2013.01); *H04L 1/0068* (2013.01)

(58) Field of Classification Search
CPC .... H04L 1/0041; H04L 1/0061; H04L 1/0068
See application file for complete search history.

(56) References Cited

U.S. PATENT DOCUMENTS

2020/0153458 A1 5/2020 Strobel et al.

OTHER PUBLICATIONS

Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHZ Band, IEEE Std 802.11a-1999, total 90 pages, Institute of Electrical and Electronics Engineers, New York, New York (Sep. 16, 1999).

(Continued)

*Primary Examiner* — Gbemileke J Onamuti
(74) *Attorney, Agent, or Firm* — Leydig, Voit & Mayer, Ltd.

(57) ABSTRACT

An encoding method, a decoding method, and a related apparatus are provided, which may be applied to a wireless local area network system. An encoding apparatus determines first available bits based on to-be-encoded data bits and a first encoding rate, and determines a second codeword number and a second codeword length based on the first available bits and a correspondence between the first available bits, a first codeword number, and a first codeword length at the first encoding rate. The second codeword number is obtained based on the first codeword number, and the second codeword length is obtained based on the first codeword length. The encoding apparatus does not need to store a correspondence between available bits, a codeword number, and a codeword length at a second encoding rate, thereby reducing storage overheads of the encoding apparatus.

20 Claims, 12 Drawing Sheets

(56) References Cited

OTHER PUBLICATIONS

"IEEE Standard for Information technology—Telecommunications and information exchange between systems Local and metropolitan area networks—Specific requirements, Part 11: Wireless LAN Medium Access Control (MAC) and Physical Layer (PHY) Specifications—Amendment 4: Enhancements for Very High Throughput for Operation in Bands below 6 Ghz," IEEE Std 802.11ac™-2013, total 425 pages, Institute of Electrical and Electronics Engineers, New York, New York (Dec. 11, 2013).
"IEEE Standard for Information technology—Telecommunications and information exchange between systems—Local and metropolitan area networks Specific requirements—Part 11: Wireless LAN Medium Access Control (MAC) and Physical Layer (PHY) Specifications—Amendment 5: Enhancements for Higher Throughput," IEEE Std 802.11n™-2009, total 536 pages, Institute of Electrical and Electronics Engineers, New York, New York (Oct. 29, 2009).
"IEEE P802.11ax™/D8.0, Draft Standard for Information technology—Telecommunications and information exchange between systems Local and metropolitan area networks Specific requirements—Part 11: Wireless LAN Medium Access Control (MAC) and Physical Layer (PHY) Specifications—Amendment 1: Enhancements for High Efficiency Wlan," IEEE P802.11ax™/D8.0, total 820 pages, Institute of Electrical and Electronics Engineers, New York, New York (Oct. 2020).
"IEEE P802.11be™M/D0.3, Draft Standard for Information technology—Telecommunications and information exchange between systems Local and metropolitan area networks Specific requirements—Part 11: Wireless LAN Medium Access Control (MAC) and Physical Layer (PHY) Specifications—Amendment 8: Enhancements for extremely high throughput (EHT)," IEEE P802.11be™/D0.3, total 196 pages, Institute of Electrical and Electronics Engineers, New York, New York (Jan. 2021).
"Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band," IEEE Std 802.11b-1999, total 97 pages, Institute of Electrical and Electronics Engineers, New York, New York (Sep. 16, 1999).
"IEEE Standard for Information technology—Telecommunications and information exchange between systems—Local and metropolitan area networks Specific requirements—Part 11: Wireless LAN Medium Access Control (MAC) and Physical Layer (PHY) specifications—Amendment 4: Further Higher Data Rate Extension in the 2.4 GHz Band," IEEE Std 802.11g™-2003, total 77 pages, Institute of Electrical and Electronics Engineers, New York, New York (Jun. 12, 2003).
IEEE Standard for Information technology—Telecommunications and information exchange between systems Local and metropolitan area networks—Specific requirements Part 11: Wireless LAN Medium Access Control (MAC) and Physical Layer (PHY) Specifications, IEEE Std 802.11™-2016, total 3534 pages, Institute of Electrical and Electronics Engineers, New York, New York (Dec. 7, 2016).

ENCODING METHOD, DECODING METHOD, AND RELATED APPARATUS

CROSS-REFERENCE TO RELATED APPLICATIONS

This application is a continuation of International Application No. PCT/CN2022/116437, filed on Sep. 1, 2022, which claims priority to Chinese Patent Application No. 202111082976.4, filed on Sep. 15, 2021. The disclosures of the aforementioned applications are hereby incorporated by reference in their entireties.

TECHNICAL FIELD

Embodiments of this application relate to the field of communication technologies, and in particular, to an encoding method, a decoding method, and a related apparatus.

BACKGROUND

A wireless local area network (WLAN) communication technology has gone through many generations, including 802.11a/b/g, 802.11n, 802.11ac, 802.11ax, 802.11be (which may also be referred to as an extremely high throughput (EHT) standard) that is being discussed, and the like according to the releasing order of the communication standards. In WLAN communication, an uplink resource of a non-access point station (non-AP STA) is mainly allocated by an access point (AP), and to-be-sent data of a STA needs to be encoded before being transmitted on an uplink resource specified by the AP.

In a WLAN encoding process, using 802.11n as an example, low density parity check (LDPC) encoding needs to be performed on to-be-sent data bits of a STA, to obtain an encoded bit sequence. Currently, for LDPC encoding, supported encoding rates mainly include 1/2, 2/3, 3/4, and 5/6. To enable a system to support a higher encoding rate, if an encoder supporting a relatively low encoding rate is used for encoding, a relatively high encoding rate may be implemented by puncturing more parity bits. However, for an encoder supporting a relatively low encoding rate, how to obtain a codeword length and a codeword number that correspond to a relatively high encoding rate is a problem that needs to be considered.

SUMMARY

Embodiments of this application provide an encoding method, a decoding method, and a related apparatus, so that an encoding apparatus determines a second codeword number and a second codeword length based on first available bits and a first correspondence, thereby reducing storage overheads of the encoding apparatus.

A first aspect of this application provides an encoding method, including: an encoding apparatus determines first payload bits, where the first payload bits are to-be-encoded data bits. The encoding apparatus determines first available bits based on the first payload bits and a first encoding rate; and then the encoding apparatus determines a second codeword number and a second codeword length based on the first available bits and a first correspondence. The first correspondence is a correspondence between the first available bits, a first codeword number, and a first codeword length of the encoding apparatus at the first encoding rate, the second codeword number is obtained based on the first codeword number, and the second codeword length is obtained based on the first codeword length. Therefore, the encoding apparatus determines the second codeword number and the second codeword length based on the first correspondence and the first available bits, so that the encoding apparatus does not need to store a correspondence between available bits, a codeword number, and a codeword length at a second encoding rate, thereby reducing storage overheads of the encoding apparatus. For example, the encoding apparatus may obtain, based on a correspondence between the first available bits at the first encoding rate (a relatively low encoding rate), the first codeword number, and the first codeword length, a codeword length and a codeword number that correspond to a relatively high encoding rate. The encoding apparatus does not need to store a correspondence between available bits, a codeword number, and a codeword length at a relatively high encoding rate, thereby reducing storage overheads of the encoding apparatus.

In a possible implementation, that the second codeword number is obtained based on the first codeword number includes: the second codeword number is equal to the first codeword number. In this possible implementation, the second codeword number is the first codeword number, so that the encoding apparatus determines, based on the first correspondence, a codeword number corresponding to a high bit rate.

In another possible implementation, that the encoding apparatus determines a second codeword number and a second codeword length based on the first available bits and a first correspondence includes: the encoding apparatus determines, from the first correspondence, the first codeword number and the first codeword length that correspond to the first available bits; the encoding apparatus uses the first codeword number as the second codeword number; and the encoding apparatus updates the first codeword length to obtain the second codeword length.

In this possible implementation, a specific implementation in which the encoding apparatus determines the second codeword number and the second codeword length is shown, which facilitates implementation of the solution. The encoding apparatus may determine, from the first correspondence, the first codeword number and the first codeword length that correspond to the first available bits, and then determine the second codeword number and the second codeword length based on the first codeword number and the first codeword length. The encoding apparatus does not need to store a correspondence between available bits, a codeword number, and a codeword length at a relatively high encoding rate, thereby reducing storage overheads of the encoding apparatus.

In another possible implementation, that the encoding apparatus updates the first codeword length to obtain the second codeword length includes:

$$L_{LDPC2} = L_{LDPC1} - N_{punc\_per\_cw\_default}$$

where $L_{LDPC2}$ is the second codeword length, $L_{LDPC1}$ is the first codeword length, and $N_{punc\_per\_cw\_default}$ is a number of default parity bits that need to be punctured in a codeword by the encoding apparatus at a second encoding rate.

In this possible implementation, an implementation in which the encoding apparatus obtains the second codeword length based on the first codeword length is provided, which facilitates implementation of the solution. It can be learned from the foregoing implementation that the second codeword length is equal to the first codeword length minus the number of default parity bits that need to be punctured in a codeword. In other words, the encoding apparatus determines the first codeword length based on the first correspondence and the first available bits, and then corrects the first codeword length, to obtain a second codeword length corresponding to a relatively high encoding rate. The encoding apparatus does not need to store a correspondence between available bits, a codeword number, and a codeword length at a relatively high encoding rate, thereby reducing storage overheads of the encoding apparatus.

In another possible implementation, that the encoding apparatus updates the first codeword length to obtain the second codeword length includes:

$$L_{LDPC2} = L_{LDPC1} - N_{punc\_per\_cw\_default} - N_{short\_per\_cw\_default}$$

where $L_{LDPC2}$ is the second codeword length, $L_{LDPC1}$ is the first codeword length, $N_{punc\_per\_cw\_default}$ is a number of default parity bits that need to be punctured in a codeword by the encoding apparatus at a second encoding rate, and $N_{short\_per\_cw\_default}$ is a number of default shortened bits required by a codeword of the encoding apparatus at the second encoding rate.

In this possible implementation, another specific manner in which the encoding apparatus determines the second codeword length based on the first codeword length is provided, so that the solution is more comprehensive. For example, in a scenario of precise puncturing, LDPC encoding at the second encoding rate may be implemented in the foregoing implementation. It can be learned from the foregoing implementation that the second codeword length is equal to the first codeword length minus a sum of the number of default parity bits that need to be punctured in a codeword and the number of default shortened bits required by a codeword. In other words, the encoding apparatus determines the first codeword length based on the first correspondence and the first available bits, and then corrects the first codeword length, to obtain a second codeword length corresponding to a relatively high encoding rate. The encoding apparatus does not need to store a correspondence between available bits, a codeword number, and a codeword length at a relatively high encoding rate, thereby reducing storage overheads of the encoding apparatus.

In another possible implementation, the second codeword number is a codeword number of the encoding apparatus at a second encoding rate, and the second codeword length is a codeword length of the encoding apparatus at the second encoding rate.

In this implementation, the technical solution of this application is applicable to a scenario in which the encoding apparatus at the first encoding rate implements LDPC encoding at the second encoding rate. According to the technical solution of this application, the encoding apparatus may obtain, based on the correspondence between the first available bits, the first codeword number, and the first codeword length at the first encoding rate, the second codeword length and the second codeword number that correspond to the second encoding rate. The encoding apparatus does not need to store a correspondence between available bits, a codeword number, and a codeword length at the second encoding rate, thereby reducing storage overheads of the encoding apparatus.

In another possible implementation, the first encoding rate is less than the second encoding rate.

In this implementation, the technical solution of this application is applicable to a scenario in which the encoding apparatus at the first encoding rate implements LDPC encoding at the second encoding rate, thereby improving transmission efficiency and improving communication performance.

In another possible implementation, the first payload bits are bits in a physical layer service data unit (PSDU) and a service field that are not encoded; or the first payload bits are bits in a PSDU, a service field, and pre-forward error correction padding bits that are not encoded.

In this possible implementation, this application is applicable to different versions of Wi-Fi standards. For example, in the 802.11n standard, the first payload bits are bits in a PSDU and a service field that are not encoded. In the 802.11be standard, the first payload bits are bits in a PSDU, a service field, and pre-forward error correction padding bits that are not encoded.

In another possible implementation, the first available bits $$N_{avbits,middle} = \frac{N_{pld1}}{R_{low}},$$

where $N_{pld1}$ is a number of first payload bits, and $R_{low}$ is the first encoding rate.

In this possible implementation, the encoding apparatus determines the first available bits based on the first payload bits and the first encoding rate. The first available bits may be understood as middle available bits. Therefore, the encoding apparatus may still obtain the second codeword number and the second codeword length based on the first correspondence. For example, the second codeword number is a codeword number corresponding to the second encoding rate of the encoding apparatus, and the second codeword length is a codeword length corresponding to the second encoding rate of the encoding apparatus. In other words, a codeword number and a codeword length that are used by the encoding apparatus when the encoding apparatus at the first encoding rate implements LDPC encoding at the second encoding rate. In this way, the encoding apparatus does not need to establish a new correspondence between available bits, a codeword number, and a codeword length at the second encoding rate, thereby reducing storage overheads of the encoding apparatus.

In another possible implementation, that the encoding apparatus determines first available bits based on the first payload bits and a first encoding rate includes:

the encoding apparatus determines the first available bits based on the first payload bits, the first encoding rate, and a first ratio, where the first ratio is a ratio of a number of first information bits to a number of second information bits, the first information bits are information bits corresponding to a codeword of the encoding apparatus at the second encoding rate, and the second information bits are information bits corresponding to a codeword of the encoding apparatus at the first encoding rate; and the number of first information bits is equal to the number of second information bits minus the number of default shortened bits required by a codeword.

In this possible implementation, the encoding apparatus determines the first available bits based on the first payload bits, the first encoding rate, and the first ratio. The first available bits may be understood as middle available bits. Therefore, the encoding apparatus may still obtain the second codeword number and the second codeword length based on the first correspondence. In this implementation, the first ratio is considered, mainly for a case in which there are default parity bits in a codeword in a precise puncturing scenario, so that the technical solution of this application is also applicable to the precise puncturing scenario, and the solution is more comprehensive.

In another possible implementation, a number of first available bits is $$N_{avbits,middle} = \frac{N_{pld1}}{r_{pld} R_{low}},$$

where $N_{pld1}$ is a number of first payload bits, $R_{low}$ is the first encoding rate, and $r_{pld}$ is the first ratio.

In this possible implementation, a specific calculation manner of the first available bits are shown. The encoding apparatus obtains middle available bits through calculation based on the first encoding rate, the first payload bits, and the first ratio. In this way, the encoding apparatus may still determine, based on the first correspondence, the second codeword number and the second codeword length that correspond to the second encoding rate.

In another possible implementation, the method further includes: the encoding apparatus encodes the first payload bits based on the second codeword number and the second codeword length, to obtain an encoded bit sequence; and the encoding apparatus generates a physical layer protocol data unit (PPDU) based on the encoded bit sequence, and outputs the PPDU to a decoding apparatus.

In this implementation, the encoding apparatus (supporting the first encoding rate) encodes the first payload bits based on the second codeword number and the second codeword length, to implement LDPC encoding at the second encoding rate. There is no need to design a new encoder supporting the second encoding rate, thereby simplifying implementation of the solution. Further, an encoding apparatus at a low bit rate implements LDPC encoding at a high bit rate by using the technical solution in this application, thereby improving transmission efficiency.

In another possible implementation, the first payload bits includes data bits in a first codeword; and that the encoding apparatus encodes the first payload bits based on the second codeword number and the second codeword length, to obtain an encoded bit sequence includes: if a number of first parity bits is 0, the encoding apparatus determines repeat bits in the first codeword, where the repeat bits in the first codeword are repeated starting from a start bit of data bits in the first codeword, and the number of first parity bits is determined based on the second codeword number, the second codeword length, and the first payload bits.

In this possible implementation, a specific manner of determining the repeat bits in the first codeword is provided. The repeat bits in the first codeword are repeated starting from the start bit of data bits in the first codeword. In other words, the data bits in the first codeword are carried by using the repeat bits in the first codeword, which helps the decoding apparatus decode the data bits in the first codeword, thereby improving decoding accuracy and improving decoding performance.

In another possible implementation, the first payload bits include data bits in a first codeword; and that the encoding apparatus encodes the first payload bits based on the second codeword number and the second codeword length, to obtain an encoded bit sequence includes:

- if a number of first parity bits is 0, determining, by the encoding apparatus, repeat bits in the first codeword, where the repeat bits in the first codeword are repeated starting from a start bit of default parity bits in the first codeword, and the number of first parity bits is determined based on the second codeword number, the second codeword length, and the first payload bits; and
- when neither a first condition nor a second condition is met, the repeat bits in the first codeword are repeated starting from a start bit of data bits in the first codeword, where
- the first condition includes: a number of second parity bits is greater than a product of a first value and a number of third parity bits, and the first value is greater than or equal to a first threshold, where the number of second parity bits is a number of parity bits that need to be punctured in a codeword corresponding to the first codeword number of the encoding apparatus at the first encoding rate, and the number of third parity bits is a number of parity bits included in the codeword corresponding to the first codeword number of the encoding apparatus at the first encoding rate; and
- the second condition includes: the number of second parity bits is greater than a product of a second value and the number of third parity bits, and a ratio of a number of first shortened bits to the number of second parity bits is less than a product of a first weight factor and a second threshold, where the second value is greater than or equal to a third threshold, the second threshold is determined based on the first encoding rate, and the number of first shortened bits is a number of shortened bits included in the codeword corresponding to the first codeword number of the encoding apparatus at the first encoding rate.

In this possible implementation, the repeat bits in the first codeword may be repeated starting from a start bit of default parity bits in the first codeword. In this way, the default parity bits may be restored to help the decoding apparatus perform decoding. When neither the first condition nor the second condition is met, the encoding apparatus may consider that when there is little impact on performance of parity bit puncturing, the repeat bits in the first codeword may be repeated starting from the start bit of data bits in the first codeword, and the default parity bits in the first codeword do not need to be restored, because in this case, a performance gain of restoring some default parity bits is not high. The repeat bits in the first codeword may be repeated starting from the start bit of data bits in the first codeword, which helps help the decoding apparatus perform decoding, thereby improving decoding accuracy and improving decoding performance.

In another possible implementation, the number of first parity bits is $N_{punc2}=\max(0, (N_{CW2} \times L_{LDPC2}) - N_{avbits,real} - N_{shrt2})$, where $N_{CW2}$ is the second codeword number, $L_{LDPC2}$ is the second codeword length, $N_{avbits,real}$ is a number of available bits of the encoding apparatus at the second encoding rate, and $N_{shrt2}$ is a number of shortened bits included in a codeword corresponding to the second codeword number of the encoding apparatus at the second encoding rate.

In this possible implementation, a specific manner of calculating the number of first parity bits is shown. The number of first parity bits may be understood as the number of parity bits that need to be punctured in the codeword corresponding to the second codeword number when the default parity bits in the codeword corresponding to the first codeword number are not considered.

In another possible implementation, that the encoding apparatus encodes the first payload bits based on the second codeword number and the second codeword length, to obtain an encoded bit sequence includes:

if a third condition and/or a fourth condition are/is met, the encoding apparatus determines to add an LDPC extra symbol segment, where the third condition includes: a number of first parity bits is greater than a product of a first value and a number of fourth parity bits, where the first value is greater than or equal to a first threshold, the number of first parity bits is determined based on the second codeword number, the second codeword length, and the first payload bits, the number of fourth parity bits is a number of parity bits included in a codeword corresponding to the second codeword number of the encoding apparatus at the second encoding rate; and the fourth condition includes: the number of first parity bits is greater than a product of a second value and the number of fourth parity bits, and a ratio of a number of second shortened bits to the number of first parity bits is less than a product of a first weight factor and a fourth threshold, where the second value is greater than or equal to a third threshold, the number of second shortened bits is a number of shortened bits included in the codeword corresponding to the second codeword number of the encoding apparatus at the second encoding rate, and the fourth threshold is determined based on the second encoding rate.

In the foregoing implementation, in a process in which the encoding apparatus determines whether an extra symbol segment is required to resolve a problem of puncturing excess parity bits, the encoding apparatus should perform determining by using related parameters (for example, the number of first parity bits, the number of fourth parity bits, and the number of second shortened bits) corresponding to the second encoding rate, so that an effective bit rate is always less than or equal to the second encoding rate, thereby improving decoding performance.

In another possible implementation, that the encoding apparatus encodes the first payload bits based on the second codeword number and the second codeword length, to obtain an encoded bit sequence includes:

if a fifth condition and/or a sixth condition are/is met, the encoding apparatus determines to add an LDPC extra symbol segment, where the fifth condition includes: a number of second parity bits is greater than a product of a third value and a number of third parity bits, where the third value is greater than 0.3, the number of second parity bits is a number of parity bits that need to be punctured in a codeword corresponding to the first codeword number of the encoding apparatus at the first encoding rate, and the number of third parity bits is a number of parity bits included in the codeword corresponding to the first codeword number of the encoding apparatus at the first encoding rate; and the sixth condition includes: the number of second parity bits is greater than a product of a fourth value and the number of third parity bits, a ratio of a number of second shortened bits to a number of first parity bits is less than a product of a first weight factor and a fourth threshold, the fourth value is greater than 0.1, the number of first parity bits is determined based on the second codeword number, the second codeword length, and the first payload bits, the number of second shortened bits is a number of shortened bits included in a codeword corresponding to the second codeword number of the encoding apparatus at the second encoding rate, and the fourth threshold is determined based on the second encoding rate.

In this implementation, in a process in which the encoding apparatus determines whether an extra symbol segment is required to resolve a problem of puncturing excess parity bits, the encoding apparatus performs determining by using related parameters (for example, the number of second parity bits, the number of third parity bits, and the number of first shortened bits) corresponding to the first encoding rate, to better adapt to the encoding apparatus supporting the first encoding rate.

A second aspect of this application provides a decoding method. The method includes:

a decoding apparatus receives a PPDU from an encoding apparatus, where the PPDU carries a bit sequence encoded by the encoding apparatus; and the decoding apparatus decodes, based on a second codeword number and a second codeword length, the bit sequence encoded by the encoding apparatus, to obtain decoded data bits, where the second codeword number and the second codeword length are determined based on first available bits and a first correspondence, the first correspondence is a correspondence between the first available bits, a first codeword number, and a first codeword length of the encoding apparatus at a first encoding rate, the first available bits are determined based on first payload bits and the first encoding rate, the first payload bits are data bits in the encoded bit sequence, the second codeword number is obtained based on the first codeword number, and the second codeword length is obtained based on the first codeword length.

In the foregoing technical solution, the decoding apparatus decodes, based on a second codeword number and a second codeword length, the bit sequence encoded by the encoding apparatus, to obtain decoded data bits. The second codeword number and the second codeword length are determined by the decoding apparatus based on the first correspondence and the first available bits, so that the decoding apparatus does not need to store a correspondence between available bits, a codeword number, and a codeword length at a second encoding rate, thereby reducing storage overheads of the decoding apparatus. For example, the decoding apparatus may obtain, based on a correspondence between the first available bits at the first encoding rate (a relatively low encoding rate), the first codeword number, and the first codeword length, a codeword length and a codeword number that correspond to a relatively high encoding rate. The decoding apparatus does not need to store a correspondence between available bits, a codeword number, and a codeword length at a relatively high encoding rate, thereby reducing storage overheads of the encoding apparatus.

In a possible implementation, that the second codeword number is obtained based on the first codeword number includes: the second codeword number is equal to the first codeword number. In this possible implementation, the second codeword number is the first codeword number, so that the decoding apparatus determines, based on the first correspondence, a codeword number corresponding to a high bit rate.

In another possible implementation, that the second codeword length is obtained based on the first codeword length includes:

$$L_{LDPC2} = L_{LDPC1} - N_{punc\_per\_cw\_default}$$

where $L_{LDPC2}$ is the second codeword length, $L_{LDPC1}$ is the first codeword length, and $N_{punc\_per\_cw\_default}$ is a number of default parity bits that need to be punctured in a codeword by the encoding apparatus at a second encoding rate.

In this possible implementation, an implementation in which the decoding apparatus obtains the second codeword length based on the first codeword length is provided, which facilitates implementation of the solution. It can be learned from the foregoing implementation that the second codeword length is equal to the first codeword length minus the number of default parity bits that need to be punctured in a codeword. In other words, the decoding apparatus determines the first codeword length based on the first correspondence and the first available bits, and then corrects the first codeword length, to obtain a second codeword length corresponding to a relatively high encoding rate. The decoding apparatus does not need to store a correspondence between available bits, a codeword number, and a codeword length at a relatively high encoding rate, thereby reducing storage overheads of the decoding apparatus.

In another possible implementation, that the second codeword length is obtained based on the first codeword length includes:

$$L_{LDPC2} = L_{LDPC1} - N_{punc\_per\_cw\_default} - N_{short\_per\_cw\_default}$$

where $L_{LDPC2}$ is the second codeword length, $L_{LDPC1}$ is the first codeword length, $N_{punc\_per\_cw\_default}$ is a number of default parity bits that need to be punctured in a codeword by the encoding apparatus at a second encoding rate, and $N_{short\_per\_cw\_default}$ is a number of default shortened bits required by a codeword of the encoding apparatus at the second encoding rate.

In this possible implementation, another specific manner in which the decoding apparatus determines the second codeword length based on the first codeword length is provided, so that the solution is more comprehensive. For example, in a scenario of precise puncturing, LDPC encoding at the second encoding rate may be implemented in the foregoing implementation. It can be learned from the foregoing implementation that the second codeword length is equal to the first codeword length minus a sum of the number of default parity bits that need to be punctured in a codeword and the number of default shortened bits required by a codeword. In other words, the decoding apparatus determines the first codeword length based on the first correspondence and the first available bits, and then corrects the first codeword length, to obtain a second codeword length corresponding to a relatively high encoding rate. The decoding apparatus does not need to store a correspondence between available bits, a codeword number, and a codeword length at a relatively high encoding rate, thereby reducing storage overheads of the decoding apparatus.

In another possible implementation, the second codeword number is a codeword number of the encoding apparatus at a second encoding rate, and the second codeword length is a codeword length of the encoding apparatus at the second encoding rate.

In this implementation, the technical solution of this application is applicable to a scenario in which the encoding apparatus at the first encoding rate implements LDPC encoding at the second encoding rate. According to the technical solution of this application, the decoding apparatus may obtain, based on the correspondence between the first available bits, the first codeword number, and the first codeword length at the first encoding rate, the second codeword length and the second codeword number that correspond to the second encoding rate. The decoding apparatus does not need to store a correspondence between available bits, a codeword number, and a codeword length at the second encoding rate, thereby reducing storage overheads of the decoding apparatus.

In another possible implementation, the first encoding rate is less than the second encoding rate.

In this implementation, the technical solution of this application is applicable to a scenario in which the encoding apparatus at the first encoding rate implements LDPC encoding at the second encoding rate, thereby improving transmission efficiency and improving communication performance.

In another possible implementation, the first payload bits are bits in a PSDU and a service field that are not encoded; or the first payload bits are bits in a PSDU, a service field, and pre-forward error correction padding bits that are not encoded.

In this possible implementation, this application is applicable to different versions of Wi-Fi standards. For example, in the 802.11n standard, the first payload bits are bits in a PSDU and a service field that are not encoded. In the 802.11be standard, the first payload bits are bits in a PSDU, a service field, and pre-forward error correction padding bits that are not encoded.

In another possible implementation, a number of first available bits is $$N_{avbits,middle} = \frac{N_{pld1}}{R_{low}},$$

where $N_{pld1}$ is a number of first payload bits, and $R_{low}$ is the first encoding rate.

In this possible implementation, the decoding apparatus determines the first available bits based on the first payload bits and the first encoding rate. The first available bits may be understood as middle available bits. Therefore, the decoding apparatus may still obtain the second codeword number and the second codeword length based on the first correspondence. For example, the second codeword number is a codeword number corresponding to the second encoding rate of the encoding apparatus, and the second codeword length is a codeword length corresponding to the second encoding rate of the encoding apparatus. The decoding apparatus does not need to establish a new correspondence between available bits, a codeword number, and a codeword length at the second encoding rate, thereby reducing storage overheads of the encoding apparatus.

In another possible implementation, a number of first available bits is $$N_{avbits,middle} = \frac{N_{pld1}}{r_{pld} R_{low}},$$

where $N_{pld1}$ is a number of first payload bits, $R_{low}$ is the first encoding rate, $r_{pld}$ is a first ratio, the first ratio is a ratio of a number of first information bits to a number of second information bits, the first information bits are information bits corresponding to a codeword of the encoding apparatus at the second encoding rate, the second information bits are information bits corresponding to a codeword of the encoding apparatus at the first encoding rate, and the number of first information bits is equal to the number of second information bits minus the number of default shortened bits required by a codeword.

In this possible implementation, a specific calculation manner of the first available bits are shown. The decoding apparatus obtains middle available bits through calculation based on the first encoding rate, the first payload bits, and the first ratio. Therefore, the decoding apparatus may still determine the second codeword number and the second codeword length based on the first correspondence.

In another possible implementation, the first payload bits include data bits in the first codeword, and the encoded bit sequence includes repeat bits in the first codeword; and if a number of first parity bits is 0, the repeat bits in the first codeword are repeated starting from a start bit of data bits in the first codeword, and the first parity bits are determined based on the second codeword number, the second codeword length, and the first payload bits.

In this possible implementation, a specific form of the repeat bits in the first codeword is provided. The repeat bits in the first codeword are repeated starting from the start bit of data bits in the first codeword. In other words, the data bits in the first codeword are carried by using the repeat bits in the first codeword. This helps the decoding apparatus decode the data bits in the first codeword, thereby improving decoding accuracy and improving decoding performance.

In another possible implementation, the first payload bits include data bits in the first codeword, and the encoded bit sequence includes repeat bits in the first codeword; and if a number of first parity bits is 0, the repeat bits in the first codeword are repeated starting from a start bit of default parity bits in the first codeword, and the first parity bits are determined based on the second codeword number, the second codeword length, and the first payload bits.

When neither a first condition nor a second condition is met, the repeat bits in the first codeword are repeated starting from a start bit of data bits in the first codeword, where

- the first condition includes: a number of second parity bits is greater than a product of a first value and a number of third parity bits, and the first value is greater than or equal to a first threshold, where the number of second parity bits is a number of parity bits that need to be punctured in a codeword corresponding to the first codeword number of the encoding apparatus at the first encoding rate, and the number of third parity bits is a number of parity bits included in the codeword corresponding to the first codeword number of the encoding apparatus at the first encoding rate; and
- the second condition includes: the number of second parity bits is greater than a product of a second value and the number of third parity bits, and a ratio of a number of first shortened bits to the number of second parity bits is less than a product of a first weight factor and a second threshold, where the second value is greater than or equal to a third threshold, the second threshold is determined based on the first encoding rate, and the number of first shortened bits is a number of shortened bits included in the codeword corresponding to the first codeword number of the encoding apparatus at the first encoding rate.

In this possible implementation, the repeat bits in the first codeword may be repeated starting from a start bit of default parity bits in the first codeword. In this way, the default parity bits may be restored to help the decoding apparatus perform decoding. When neither the first condition nor the second condition is met, the encoding apparatus may consider that when there is little impact on performance of parity bit puncturing, the repeat bits in the first codeword may be repeated starting from the start bit of data bits in the first codeword, and the default parity bits in the first codeword do not need to be restored, because in this case, a performance gain of restoring some default parity bits is not high. The repeat bits in the first codeword may be repeated starting from the start bit of data bits in the first codeword. This helps the decoding apparatus perform decoding, thereby improving decoding accuracy and improving decoding performance.

In another possible implementation, the number of first parity bits is $N_{punc2}=\max(0, (N_{CW2}\times L_{LDPC2})-N_{avbits,real}-N_{shrt2})$, where

- $N_{CW2}$ is the second codeword number, $L_{LDPC2}$ is the second codeword length, $N_{avbits,real}$ is a number of available bits of the encoding apparatus at the second encoding rate, and $N_{shrt2}$ is a number of shortened bits included in a codeword corresponding to the second codeword number of the encoding apparatus at the second encoding rate.

In this possible implementation, a specific manner of calculating the number of first parity bits is shown. The number of first parity bits may be understood as the number of parity bits that need to be punctured in the codeword corresponding to the second codeword number when the default parity bits in the codeword corresponding to the first codeword number are not considered.

A third aspect of this application provides an encoding apparatus, including:

- a processing module, configured to: determine first payload bits, where the first payload bits are to-be-encoded data bits; determine first available bits based on the first payload bits and a first encoding rate; and
- determine a second codeword number and a second codeword length based on the first available bits and a first correspondence. The first correspondence is a correspondence between the first available bits, a first codeword number, and a first codeword length of the encoding apparatus at the first encoding rate, the second codeword number is obtained based on the first codeword number, and the second codeword length is obtained based on the first codeword length.

In a possible implementation, that the second codeword number is obtained based on the first codeword number includes: the second codeword number is equal to the first codeword number. In this possible implementation, the second codeword number is the first codeword number, so that the encoding apparatus determines, based on the first correspondence, a codeword number corresponding to a high bit rate.

In another possible implementation, the processing module is specifically configured to:

- determine, from the first correspondence, the first codeword number and the first codeword length that correspond to the first available bits;
- use the first codeword number as the second codeword number; and update the first codeword length to obtain the second codeword length.

In another possible implementation, the second codeword length is:

$$L_{LDPC2} = L_{LDPC1} - N_{punc\_per\_cw\_default}$$

where $L_{LDPC2}$ is the second codeword length, $L_{LDPC1}$ is the first codeword length, and $N_{punc\_per\_cw\_default}$ is a number of default parity bits that need to be punctured in a codeword by the encoding apparatus at a second encoding rate.

In another possible implementation, the second codeword length is:

$$L_{LDPC2} = L_{LDPC1} - N_{punc\_per\_cw\_default} - N_{short\_per\_cw\_default}$$

where $L_{LDPC2}$ is the second codeword length, $L_{LDPC1}$ is the first codeword length, $N_{punc\_per\_cw\_default}$ is a number of default parity bits that need to be punctured in a codeword by the encoding apparatus at a second encoding rate, and $N_{short\_per\_cw\_default}$ is a number of default shortened bits required by a codeword of the encoding apparatus at the second encoding rate.

In another possible implementation, the second codeword number is a codeword number of the encoding apparatus at a second encoding rate, and the second codeword length is a codeword length of the encoding apparatus at the second encoding rate.

In another possible implementation, the first encoding rate is less than the second encoding rate.

In another possible implementation, the first payload bits are bits in a PSDU and a service field that are not encoded; or the first payload bits are bits in a PSDU, a service field, and pre-forward error correction padding bits that are not encoded.

In another possible implementation, a number of first available bits is $$N_{avbits,middle} = \frac{N_{pld1}}{R_{low}},$$

where $N_{pld1}$ is a number of first payload bits, and $R_{low}$ is the first encoding rate.

In another possible implementation, the processing module is specifically configured to:

determine the first available bits based on the first payload bits, the first encoding rate, and a first ratio, where the first ratio is a ratio of a number of first information bits to a number of second information bits, the first information bits are information bits corresponding to a codeword of the encoding apparatus at the second encoding rate, and the second information bits are information bits corresponding to a codeword of the encoding apparatus at the first encoding rate; and the number of first information bits is equal to the number of second information bits minus the number of default shortened bits required by a codeword.

In another possible implementation, a number of first available bits is $$N_{avbits,middle} = \frac{N_{pld1}}{r_{pld}R_{low}},$$

where $N_{pld1}$ is a number of first payload bits, $R_{low}$ is the first encoding rate, and $r_{pld}$ is the first ratio.

In another possible implementation, the processing module is further configured to:

encode the first payload bits based on the second codeword number and the second codeword length, to obtain an encoded bit sequence; and generate a PPDU based on an encoded bit sequence.

The encoding apparatus further includes a transceiver module, where:

the transceiver module is configured to output the PPDU to a decoding apparatus.

In another possible implementation, the first payload bits include data bits in the first codeword; and the processing module is specifically configured to:

if a number of first parity bits is 0, determine repeat bits in the first codeword, where the repeat bits in the first codeword are repeated starting from a start bit of data bits in the first codeword, and the number of first parity bits is determined based on the second codeword number, the second codeword length, and the first payload bits.

In another possible implementation, the first payload bits include data bits in the first codeword; and the processing module is specifically configured to:

if a number of first parity bits is 0, determine repeat bits in the first codeword, where the repeat bits in the first codeword are repeated starting from a start bit of default parity bits in the first codeword, and the number of first parity bits is determined based on the second codeword number, the second codeword length, and the first payload bits; and when neither a first condition nor a second condition is met, the repeat bits in the first codeword are repeated starting from a start bit of data bits in the first codeword, where the first condition includes: a number of second parity bits is greater than a product of a first value and a number of third parity bits, and the first value is greater than or equal to a first threshold, where the number of second parity bits is a number of parity bits that need to be punctured in a codeword corresponding to the first codeword number of the encoding apparatus at the first encoding rate, and the number of third parity bits is a number of parity bits included in the codeword corresponding to the first codeword number of the encoding apparatus at the first encoding rate; and the second condition includes: the number of second parity bits is greater than a product of a second value and the number of third parity bits, and a ratio of a number of first shortened bits to the number of second parity bits is less than a product of a first weight factor and a second threshold, where the second value is greater than or equal to a third threshold, the second threshold is determined based on the first encoding rate, and the number of first shortened bits is a number of shortened bits included in the codeword corresponding to the first codeword number of the encoding apparatus at the first encoding rate.

In another possible implementation, the number of first parity bits is $N_{punc2}=\max(0, (N_{CW2}\times L_{LDPC2})-N_{avbits,real}-N_{shrt2})$, where $N_{CW2}$ is the second codeword number, $L_{LDPC2}$ is the second codeword length, $N_{avbits,real}$ is a number of available bits of the encoding apparatus at the second encoding rate, and $N_{shrt2}$ is a number of shortened bits included in a codeword corresponding to the second codeword number of the encoding apparatus at the second encoding rate.

In another possible implementation, the processing module is specifically configured to:

if a third condition and/or a fourth condition are/is met, determine to add an LDPC extra symbol segment, where the third condition includes: a number of first parity bits is greater than a product of a first value and a number of fourth parity bits, where the first value is greater than or equal to a first threshold, the number of first parity bits is determined based on the second codeword number, the second codeword length, and the first payload bits, the number of fourth parity bits is a number of parity bits included in a codeword corresponding to the second codeword number of the encoding apparatus at the second encoding rate; and the fourth condition includes: the number of first parity bits is greater than a product of a second value and the number of fourth parity bits, and a ratio of a number of second shortened bits to the number of first parity bits is less than a product of a first weight factor and a fourth threshold, where the second value is greater than or equal to a third threshold, the number of second shortened bits is a number of shortened bits included in the codeword corresponding to the second codeword number of the encoding apparatus at the second encoding rate, and the fourth threshold is determined based on the second encoding rate.

In another possible implementation, the processing module is specifically configured to:

if a fifth condition and/or a sixth condition are/is met, determine to add an LDPC extra symbol segment, where the fifth condition includes: a number of second parity bits is greater than a product of a third value and a number of third parity bits, where the third value is greater than 0.3, the number of second parity bits is a number of parity bits that need to be punctured in a codeword corresponding to the first codeword number of the encoding apparatus at the first encoding rate, and the number of third parity bits is a number of parity bits included in the codeword corresponding to the first codeword number of the encoding apparatus at the first encoding rate; and the sixth condition includes: the number of second parity bits is greater than a product of a fourth value and the number of third parity bits, a ratio of a number of second shortened bits to a number of first parity bits is less than a product of a first weight factor and a fourth threshold, the fourth value is greater than 0.1, the number of first parity bits is determined based on the second codeword number, the second codeword length, and the first payload bits, the number of second shortened bits is a number of shortened bits included in a codeword corresponding to the second codeword number of the encoding apparatus at the second encoding rate, and the fourth threshold is determined based on the second encoding rate.

A fourth aspect of this application provides a decoding apparatus, including:

a transceiver module, configured to receive a PPDU from an encoding apparatus, where the PPDU carries a bit sequence encoded by the encoding apparatus; and a processing module, configured to decode, based on a second codeword number and a second codeword length, the bit sequence encoded by the encoding apparatus, to obtain decoded data bits, where the second codeword number and the second codeword length are determined based on first available bits and a first correspondence, the first correspondence is a correspondence between the first available bits, a first codeword number, and a first codeword length of the encoding apparatus at a first encoding rate, the first available bits are determined based on first payload bits and the first encoding rate, the first payload bits are data bits in the encoded bit sequence, the second codeword number is obtained based on the first codeword number, and the second codeword length is obtained based on the first codeword length.

In a possible implementation, that the second codeword number is obtained based on the first codeword number includes: the second codeword number is equal to the first codeword number.

In another possible implementation, that the second codeword length is obtained based on the first codeword length includes:

$$L_{LDPC2} = L_{LDPC1} - N_{punc\_per\_cw\_default}$$

where $L_{LDPC2}$ is the second codeword length, $L_{LDPC1}$ is the first codeword length, and $N_{punc\_per\_cw\_default}$ is a number of default parity bits that need to be punctured in a codeword by the encoding apparatus at a second encoding rate.

In another possible implementation, that the second codeword length is obtained based on the first codeword length includes:

$$L_{LDPC2} = L_{LDPC1} - N_{punc\_per\_cw\_default} - N_{short\_per\_cw\_default}$$

where $L_{LDPC2}$ is the second codeword length, $L_{LDPC1}$ is the first codeword length, $N_{punc\_per\_cw\_default}$ is a number of default parity bits that need to be punctured in a codeword by the encoding apparatus at a second encoding rate, and $N_{short\_per\_cw\_default}$ is a number of default shortened bits required by a codeword of the encoding apparatus at the second encoding rate.

In another possible implementation, the second codeword number is a codeword number of the encoding apparatus at a second encoding rate, and the second codeword length is a codeword length of the encoding apparatus at the second encoding rate.

In another possible implementation, the first encoding rate is less than the second encoding rate.

In another possible implementation, the first payload bits are bits in a PSDU and a service field that are not encoded; or the first payload bits are bits in a PSDU, a service field, and pre-forward error correction padding bits that are not encoded.

In another possible implementation, a number of first available bits is $$N_{avbits,middle} = \frac{N_{pld1}}{R_{low}},$$

where $N_{pld1}$ is a number of first payload bits, and $R_{low}$ is the first encoding rate.

In another possible implementation, a number of first available bits is $$N_{avbits,middle} = \frac{N_{pld1}}{r_{pld}R_{low}},$$

where $N_{pld1}$ is the number of first payload bits, $R_{low}$ is the first encoding rate, $r_{pld}$ is a first ratio, the first ratio is a ratio of a number of first information bits to a number of second information bits, the first information bits are information bits corresponding to a codeword of the encoding apparatus at the second encoding rate, the second information bits are information bits corresponding to a codeword of the encoding apparatus at the first encoding rate, and the number of first information bits is equal to the number of second information bits minus the number of default shortened bits required by a codeword.

In another possible implementation, the first payload bits include data bits in the first codeword, and the encoded bit sequence includes repeat bits in the first codeword; and if a number of first parity bits is 0, the repeat bits in the first codeword are repeated starting from a start bit of data bits in the first codeword, and the first parity bits are determined based on the second codeword number, the second codeword length, and the first payload bits.

In another possible implementation, the first payload bits include data bits in the first codeword, and the encoded bit sequence includes repeat bits in the first codeword; and if a number of first parity bits is 0, the repeat bits in the first codeword are repeated starting from a start bit of default parity bits in the first codeword, and the first parity bits are determined based on the second codeword number, the second codeword length, and the first payload bits.

When neither a first condition nor a second condition is met, the repeat bits in the first codeword are repeated starting from a start bit of data bits in the first codeword, where the first condition includes: a number of second parity bits is greater than a product of a first value and a number of third parity bits, and the first value is greater than or equal to a first threshold, where the number of second parity bits is a number of parity bits that need to be punctured in a codeword corresponding to the first codeword number of the encoding apparatus at the first encoding rate, and the number of third parity bits is a number of parity bits included in the codeword corresponding to the first codeword number of the encoding apparatus at the first encoding rate; and the second condition includes: the number of second parity bits is greater than a product of a second value and the number of third parity bits, and a ratio of a number of first shortened bits to the number of second parity bits is less than a product of a first weight factor and a second threshold, where the second value is greater than or equal to a third threshold, the second threshold is determined based on the first encoding rate, and the number of first shortened bits is a number of shortened bits included in the codeword corresponding to the first codeword number of the encoding apparatus at the first encoding rate.

A fifth aspect of this application provides an encoding apparatus, where the encoding apparatus includes a processor and a memory. The memory stores a computer program; and the processor is configured to invoke and run the computer program stored in the memory, to enable the processor to implement any implementation of the first aspect.

Optionally, the encoding apparatus further includes a transceiver; and the processor is further configured to control the transceiver to send and receive signals.

A sixth aspect of this application provides a decoding apparatus, where the decoding apparatus includes a processor and a memory. The memory stores a computer program. The processor is configured to invoke and run the computer program stored in the memory, to enable the processor to implement any implementation of the second aspect.

Optionally, the decoding apparatus further includes a transceiver; and the processor is further configured to control the transceiver to send and receive signals.

A seventh aspect of this application provides an encoding apparatus, where the encoding apparatus includes a processor. The processor is configured to invoke a computer program or computer instructions in a memory, so that the processor implements any implementation of the first aspect.

Optionally, the encoding apparatus further includes a transceiver, and the processor is configured to control the transceiver to send and receive signals.

An eighth aspect of this application provides a decoding apparatus, where the decoding apparatus includes a processor. The processor is configured to invoke a computer program or computer instructions in a memory, so that the processor implements any implementation of the second aspect.

Optionally, the decoding apparatus further includes a transceiver; and the processor is configured to control the transceiver to send and receive signals.

A ninth aspect of this application provides an encoding apparatus, where the encoding apparatus includes a logic circuit, and the logic circuit is configured to perform a processing operation in any implementation of the first aspect.

Optionally, the encoding apparatus further includes an input/output interface, and the input/output interface is configured to perform an input or output operation in any implementation of the first aspect.

A tenth aspect of this application provides a decoding apparatus, where the decoding apparatus includes a logic circuit and an input/output interface; the logic circuit is configured to perform a processing operation in any implementation of the second aspect; and the input/output interface is configured to perform an input or output operation in any implementation of the second aspect.

An eleventh aspect of this application provides a computer program product including instructions, where when the instructions are run on a computer, the computer is enabled to perform any implementation of the first aspect or the second aspect.

A twelfth aspect of this application provides a computer-readable storage medium, including a computer instruction, where when the computer instruction is run on a computer, the computer is enabled to perform any implementation of the first aspect or the second aspect.

A twentieth aspect of this application provides a chip apparatus, including: a processor, configured to invoke a computer program or computer instructions in a memory, so that the processor performs any implementation of the first aspect or the second aspect.

Optionally, the processor is coupled to the memory through an interface.

A fourteenth aspect of this application provides a communication system, where the communication system includes the encoding apparatus according to the first aspect and the decoding apparatus according to the second aspect.

BRIEF DESCRIPTION OF DRAWINGS

FIG. 2*d*-1 and FIG. 2*d*-2 are another schematic diagram of a trigger frame according to an embodiment of this application;

DESCRIPTION OF EMBODIMENTS

Figure 1A:
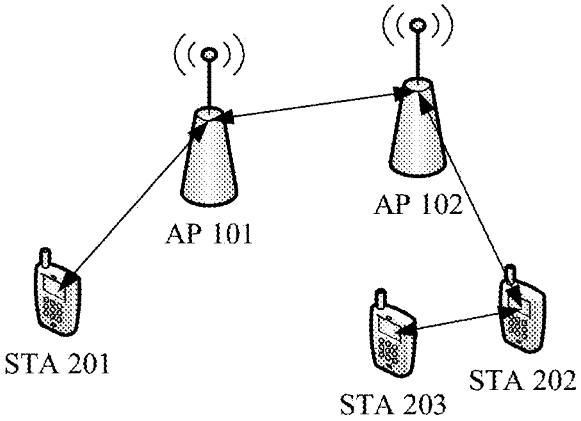
FIG. 1 a is a schematic diagram of a communication system to which an embodiment of this application is applied.
FIG. 1*b* is a schematic diagram of an AP to which an embodiment of this application is applied.
FIG. 1*c* is a schematic diagram of a STA to which an embodiment of this application is applied.

The following clearly and completely describes technical solutions in embodiments of this application with reference to the accompanying drawings in embodiments of this application.

In descriptions of this application, "/" means "or" unless otherwise specified. For example, A/B may represent A or B. A term "and/or" in this specification describes only an association relationship between associated objects and indicates that there may be three relationships. For example, A and/or B may represent the following three cases: Only A exists, both A and B exist, and only B exists. In addition, "at least one" means one or more, and "a plurality of" means two or more. "At least one of the following items" or a similar expression thereof is any combination of these items, including a singular item or any combination of plural items. For example, at least one of a, b, or c may represent a, b, c, a and b, a and c, b and c, or a, b, and c. a, b, and c each may be singular or plural.

In this application, the terms such as "example" or "for example" are used to represent giving an example, an illustration, or descriptions. Any embodiment or design scheme described as "example", "in an example", or "for example" in this application should not be explained as being preferred or advantageous over another embodiment or design scheme. Exactly, use of the term "example", "in an example", "for example", or the like is intended to present a concept in a specific manner.

It should be understood that, in this application, "when" and "if" mean that an apparatus performs corresponding processing in an objective situation, and are not intended to limit time. The terms do not mean that the apparatus is required to have a determining action during implementation, and do not mean any other limitation.

In this application, an element represented in a singular form is intended to represent "one or more" or "at least one", but does not represent "one and only one", unless otherwise specified.

For ease of understanding the method provided in embodiments of this application, the following describes a system architecture of the method provided in embodiments of this application. It may be understood that the system architecture described in embodiments of this application is intended to describe the technical solutions in embodiments of this application more clearly, and do not constitute any limitation on the technical solutions provided in embodiments of this application.

The technical solutions provided in this application may be applied to various communication systems, for example, a Wi-Fi communication system, a Bluetooth communication system, and a cellular communication system (for example, a Long Term Evolution (LTE) system, a 5th generation (5G) communication system, or a future mobile communication system). For example, the fifth generation communication system may be a new radio (NR) system. The following describes the technical solutions of this application by using an example in which this application is applied to a Wi-Fi communication system.

A communication system to which this application is applicable includes an encoding apparatus and a decoding apparatus. The encoding apparatus may be a STA or an AP, or the encoding apparatus includes some components of a STA or an AP. The decoding apparatus may be a STA or an AP, or the decoding apparatus includes some components of a STA or an AP. The AP may be a server, a router, a switch, a bridge, or the like. The STA may be a mobile phone, a tablet computer, a notebook computer, a smartwatch, a smart television, or the like.

For example, in a Wi-Fi system that uses the 802.11 standard (for example, the 802.11 standard includes but is not limited to the 802.11be standard or a next-generation 802.11 standard), scenarios to which the technical solutions of this application are applicable include: communication between an AP and one or more STAs, communication between APs, communication between STAs, and the like. In embodiments of this application, the term "communication" may also be described as "data transmission", "information transmission", or "transmission".

FIG. 1*a* is a schematic diagram of an architecture of a wireless communication system according to an embodiment of this application.

As shown in FIG. Ta, the wireless communication system may include one or more APs (for example, an AP 101 and an AP 102 in FIG. 1*a*) and one or more STAs (for example, a STA 201, a STA 202, and a STA 203 in FIG. Ta). Both the AP and the STA support a WLAN communication protocol. The communication protocol may include 802.11be (or referred to as Wi-Fi 7, EHT protocol), and may further include protocols such as 802.11ax and 802.11ac. Certainly, with continuous evolution and development of communication technologies, the communication protocol may further include a next generation protocol of 802.11be, and the like. This is not limited herein. Using a WLAN an example, an apparatus for implementing the method in this application may be an AP or a STA in the WLAN, or may be a processor, a chip, or a processing system installed in an AP or a STA.

Optionally, the access point (for example, an AP 101 or an AP 102 in FIG. 1*a*) in this application is an apparatus having a wireless communication function, which supports communication by using a WLAN protocol, has a function of communicating with another device (for example, a station or another access point) in the WLAN network, and certainly, may further have a function of communicating with another device. In a WLAN system, the access point may be referred to as an access point station (AP STA). The apparatus having a wireless communication function may be an entire device, or may be a chip or a processing system installed in an entire device, or the like. A device on which the chip or the processing system is installed may implement the method and the function in embodiments of this application under control of the chip or the processing system. The AP in embodiments of this application is an apparatus that provides a service for the STA, and may support a series of protocols of 802.11. For example, the AP may be a communication entity such as a communication server, a router, a switch, or a bridge. The AP may include a macro base station, a micro base station, a relay station, and the like in various forms. Certainly, the AP may alternatively be a chip and a processing system in these devices in various forms, to implement the methods and the functions in embodiments of this application.

Optionally, the station (for example, a STA 201, a STA 202, or a STA 203 in FIG. 1*a*) in this application is an apparatus having a wireless communication function, which supports communication by using a WLAN protocol, and has a capability of communicating with another station or an access point in the WLAN network. In a WLAN system, a station may be referred to as a non-AP STA. For example, the STA is any user communication device that allows a user to communicate with the AP and further communicate with the WLAN. The apparatus having a wireless communication function may be an entire device, or may be a chip or a processing system installed in an entire device. A device on which the chip or the processing system is installed may implement the method and the function in embodiments of this application under control of the chip or the processing system. For example, the STA may be user equipment that can be connected to the Internet, for example, a tablet computer, a desktop computer, a laptop computer, a notebook computer, an ultra-mobile personal computer (UMPC), a handheld computer, a netbook, a personal digital assistant (PDA), or a mobile phone. Alternatively, the STA may be an internet of things node in the internet of things, an in-vehicle communication apparatus in the vehicle to everything, an entertainment device, a game device or system, a global positioning system device, or the like. Alternatively, the STA may be a chip and a processing system in the foregoing terminals.

The WLAN system can provide high-speed and low-latency transmission. With the continuous evolution of WLAN application scenarios, the WLAN system is to be used in more scenarios or industries, for example, the internet of things industry, the vehicle to everything industry, a banking industry, enterprise offices, exhibition halls of stadiums, concert halls, hotel rooms, dormitories, wards, classrooms, supermarkets, squares, streets, production workshops and warehousing. Certainly, a device (for example, an access point or a station) that supports WLAN communication may be a sensor node (for example, a smart water meter, a smart electricity meter, or a smart air detection node) in a smart city, a smart device (for example, a smart camera, a projector, a display, a television, a sound system, a refrigerator, or a washing machine) in a smart home, or a node in the Internet of Things, an entertainment terminal (for example, a wearable device such as augmented reality (AR) or virtual reality (virtual reality, VR)), an intelligent device in intelligent office (for example, a printer, a projector, a loudspeaker, or an acoustic device), a vehicle to everything (V2X) device in the vehicle to everything, or a device in the industrial internet of things (IIoT), and infrastructure (for example, a vending machine, a self-service navigation station in a supermarket, a self-service cash collection device, or a self-service ordering machine) in a daily life scenario, a large-scale stadium, a music venue, or the like. Specific forms of the STA and the AP are not limited in embodiments of this application, and are merely described as examples herein.

Figure 1B:
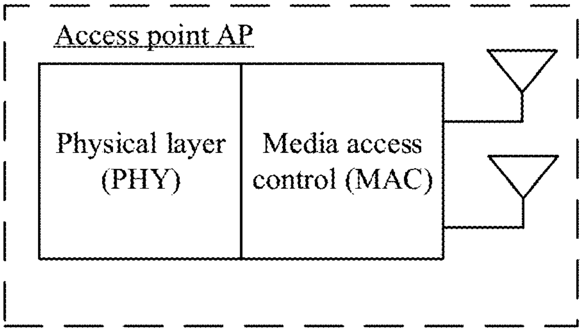
Figure 1C:
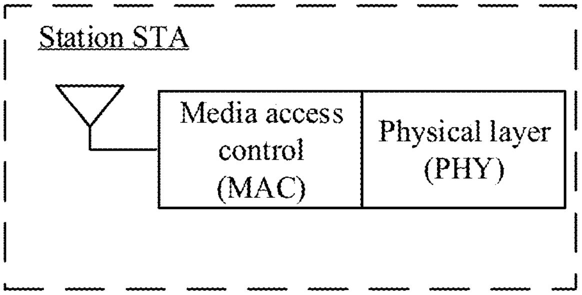

It should be understood that the 802.11 standard focuses on a physical layer (PHY) part and a medium access control (MAC) layer part. In an example, FIG. 1*b* is a schematic diagram of a structure of an access point AP according to an embodiment of this application. The AP may be a multi-antenna/multi-radio frequency, or may be a single-antenna/single-radio frequency. The antenna/radio frequency is used to send/receive data packets (the data packet in this specification may also be referred to as a physical layer protocol data unit, that is, a PPDU). In an implementation, an antenna part or a radio frequency part of the AP may be separated from a main body part of the AP, and is in a remote layout structure. In FIG. Tb, the AP may include a physical layer processing circuit and a medium access control processing circuit. The physical layer processing circuit may be configured to process a physical layer signal, and the MAC layer processing circuit may be configured to process a MAC layer signal. In another example, FIG. 1*c* is a schematic diagram of a structure of a station STA according to an embodiment of this application. FIG. 1*c* is a schematic diagram of a structure of a STA with a single antenna/radio frequency. In an actual scenario, the STA may alternatively have a plurality of antennas/radio frequencies, and may be a device with more than two antennas. The antenna/radio frequency is used to send/receive a data packet. In an implementation, an antenna part or a radio frequency part of the STA may be separated from a main body part of the STA, and is in a remote layout structure. In FIG. 1*c*, the STA may include a PHY processing circuit and a MAC processing circuit. The physical layer processing circuit may be configured to process a physical layer signal, and the MAC layer processing circuit may be configured to process a MAC layer signal.

The foregoing content briefly describes the system architecture in embodiments of this application. To better understand the technical solutions in embodiments of this application, the following describes related content of allocating an uplink resource by an AP to a STA.

Currently, a WLAN has gone through many generations, such as 802.11a/b/g, 802.11n, 802.11ac, 802.11ax, and 802.11be that is being discussed. The 802.11n standard may be referred to as a high throughput (HT), the 802.11ac standard may be referred to as a very high throughput (VHT), 802.11ax (Wi-Fi 6) may be referred to as high efficient (HE), 802.11be (Wi-Fi 7) may be referred to as an EHT, and standards before the HT, such as 802.11a/b/g, may be collectively referred to as a non-high throughput (Non-HT).

For uplink data transmission, the STA may perform uplink data transmission after obtaining a transmission opportunity through channel contention, for example, based on enhanced distributed channel access (EDCA). In 802.11ax, a trigger frame-based uplink transmission method is further introduced, and a procedure of the trigger frame-based uplink transmission method includes the following steps.

Step 1: An AP first sends a trigger frame (for example, a trigger frame in FIG. 2*a*), where the trigger frame includes related information required by one or more stations (STAs) to send a trigger based PPDU (trigger based physical layer protocol data unit, TB PPDU), for example, information such as resource unit allocation.

Figure 2A:
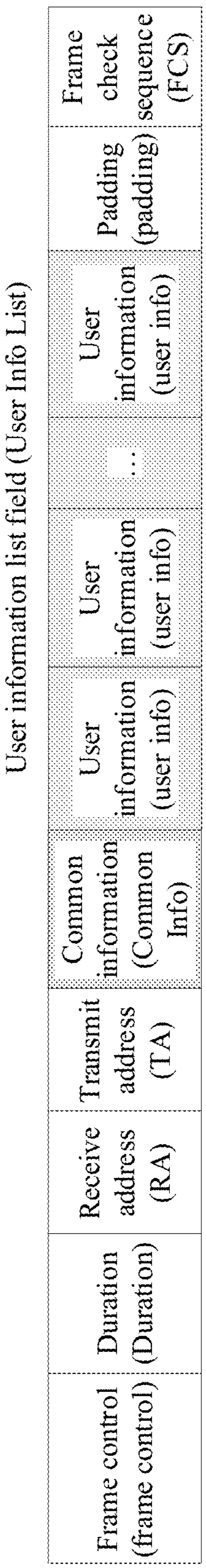
FIG. 2*a* is a schematic diagram of a trigger frame according to an embodiment of this application.
Figure 2B:
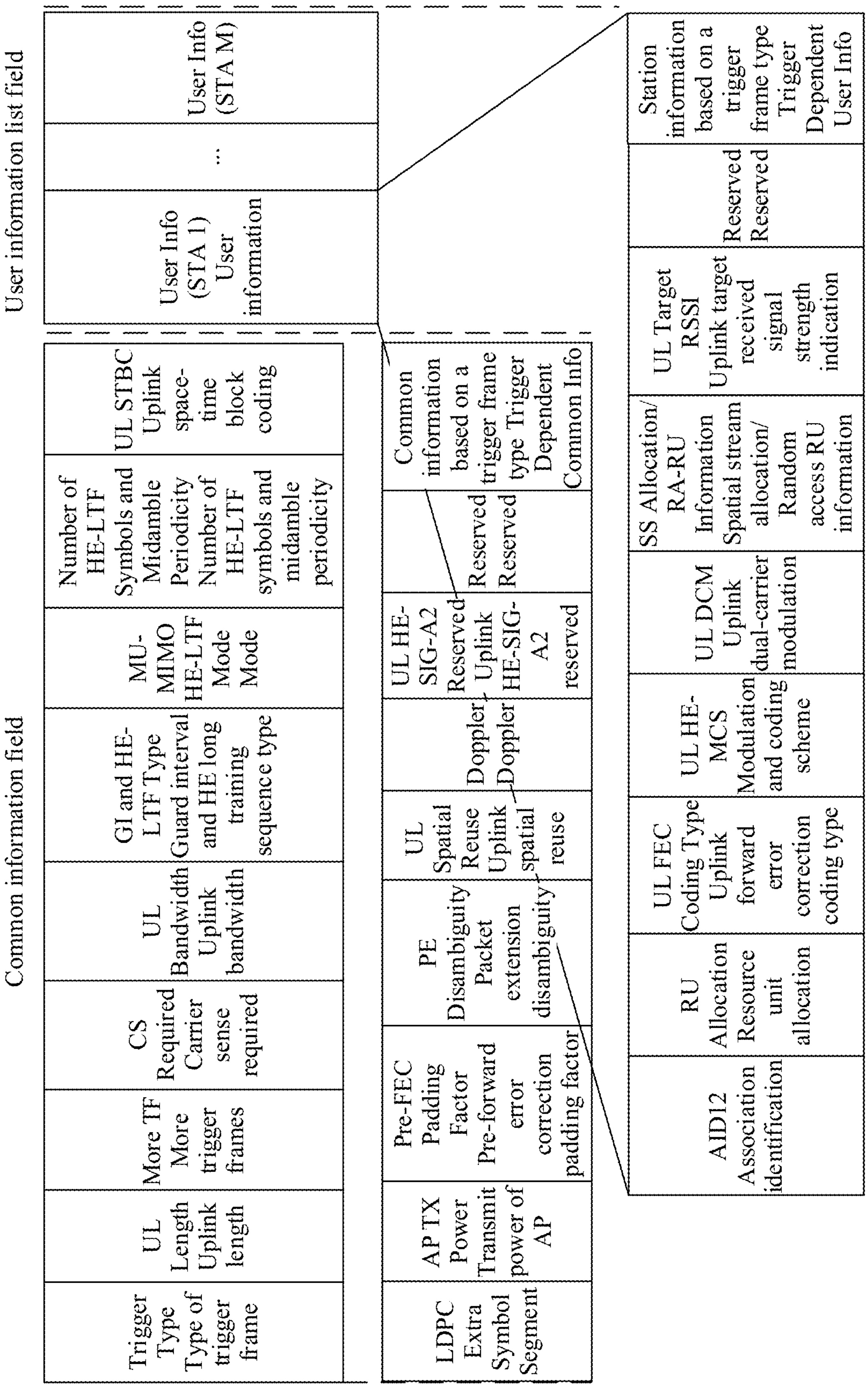
FIG. 2*b* is another schematic diagram of a trigger frame according to an embodiment of this application.

As shown in FIG. 2*a*, the entire trigger frame includes a common information (Common Info) field and a user information list (User Info List) field. The common information field includes common information that needs to be read by all STAs. The user information list field includes one or more user information fields, and each user information field includes information that needs to be read by each STA. In the user information field, association identification (Association Identification 12, AID12) represents an association identifier of a STA, and a resource unit allocation (RU Allocation) subfield indicates a location of a specific resource unit (RU) allocated to the STA (the STA indicated by the AID12). FIG. 2*b* shows specific content of the common information field and the user information field.

Step 2: After receiving the trigger frame, the STA obtains, by parsing the trigger frame, a user information field that matches the AID of the STA, and then sends a high efficient trigger based PPDU (high efficient trigger based physical layer protocol data unit, HE TB PPDU) (which is one of the four types of HE PPDUs) on an RU indicated by a resource element allocation subfield in the user information field.

Figure 2C:
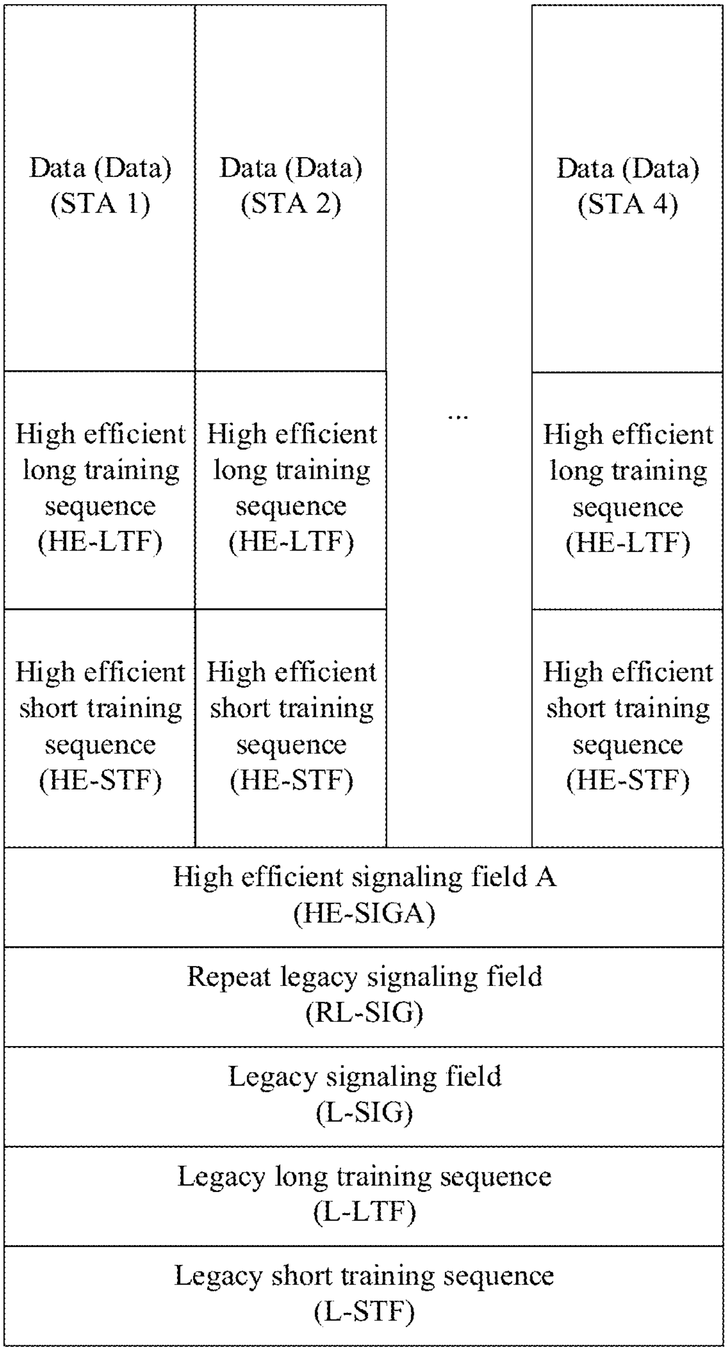
FIG. 2*c* is a schematic diagram of an HE TB PPDU according to an embodiment of this application.

For example, fields included in the HE TB PPDU are shown in FIG. 2*c*, and names and functions of the fields are as follows:

TABLE 1

Meanings of fields in an HE TB PPDU

| English acronym/ abbreviation | Complete English description | Chinese description | Function |
|---|---|---|---|
| L-STF | Legacy Short Training Field | Legacy short training sequence | Used for PPDU discovery, coarse synchronization, and automatic gain control. |
| L-LTF | Legacy Long Training Field | Legacy long training sequence | Used for precise synchronization and channel estimation |
| L-SIG | Legacy Signal Field A | Legacy signaling field | Used to carry signaling information related to a PPDU length to ensure coexistence. |
| HE-SIG-A | High Efficient Signal Field A | High efficient signaling field A | Used to carry signaling for demodulating subsequent data. |
| HE-STF | High Efficient Short Training Field | High efficient short training sequence | Used for automatic gain control of subsequent fields. |
| HE-LTF | High Efficient Long Training Field | High efficient long training sequence | Used for channel estimation. |
| Data | | Data | Used to carry information |

In Table 1, when a bandwidth is not greater than 20 MHz, the first four items (that is, the L-STF to the HE-SIG-A) are transmitted in a unit of 20 megahertz (MHz). When the bandwidth is greater than 20 MHz, the first four items (that is, the L-STF to the HE-SIG-A) are replicated and transmitted in a unit of 20 MHz.

In addition, in Table 1, the entire bandwidth may be divided into one or more resource units from the HE-STF to the last three items of the data. It should be noted that in the 802.11ax standard, only one RU can be allocated to one STA. The next-generation 802.11be standard allows a plurality of RUs (multi-RU, MRU) to be allocated to one STA.

Step 3: After receiving the uplink multi-user PPDU formed by the uplink sub-PPDUs sent by the one or more stations, the AP may further reply with an acknowledgment frame.

Figures 1, 2D:
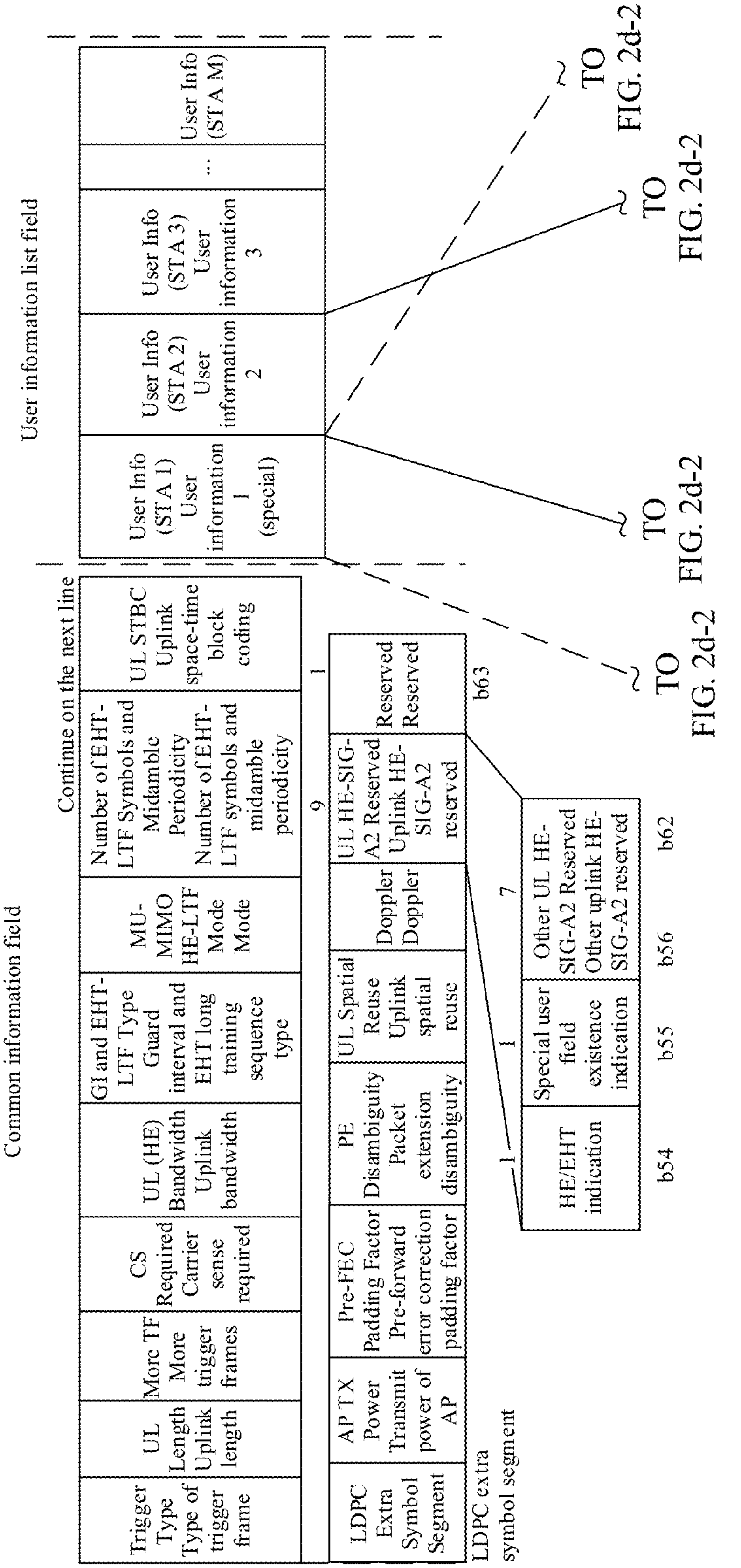
Figures 2, 2D:
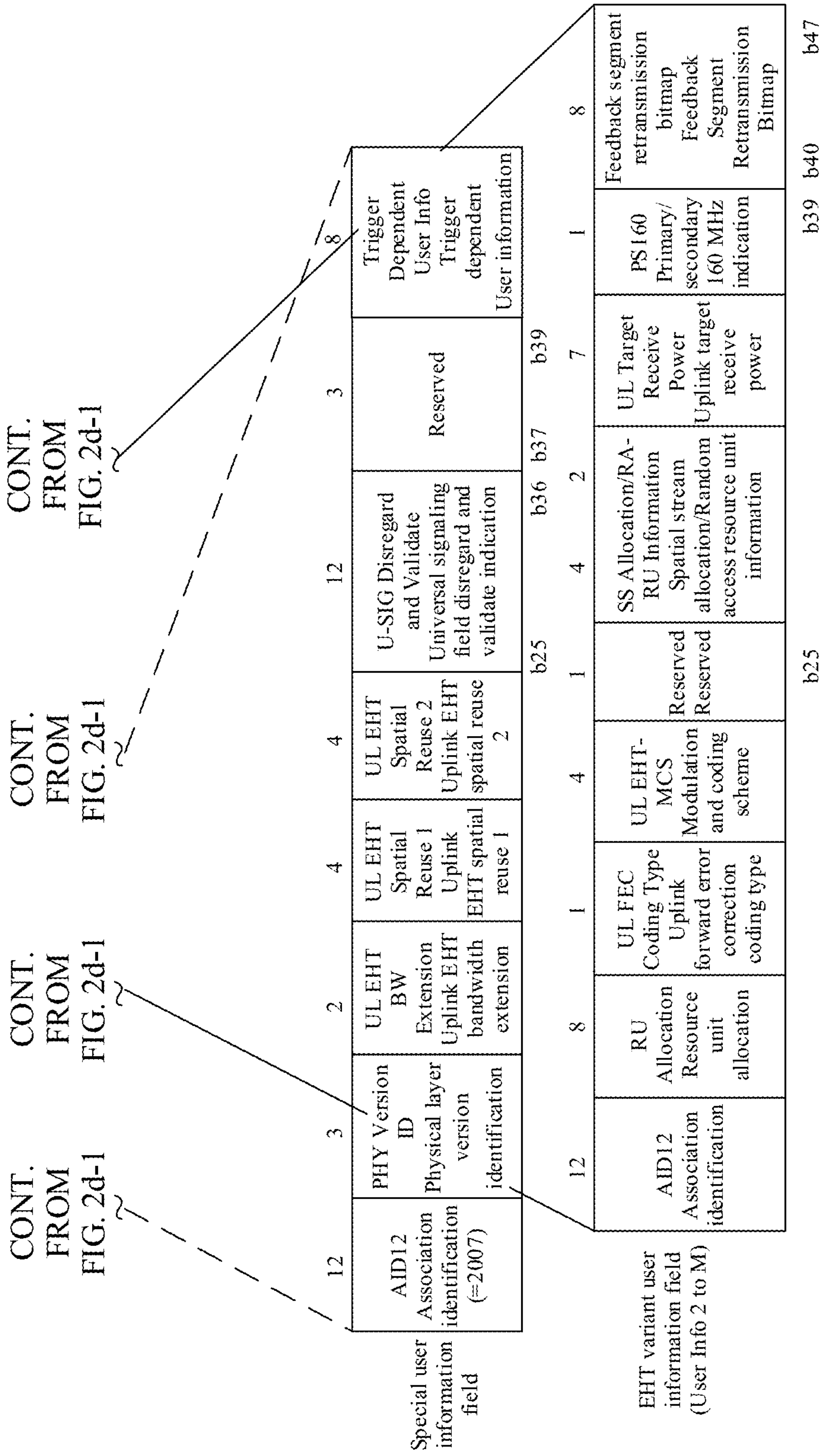

In 802.11be, there is also a procedure in which a trigger frame triggers a TB PPDU. The procedure is similar to that in 11ax, and only some other signaling indications, such as resource unit allocation in 320 MHz, are added or extended. A person skilled in the art can understand the added or extended content, which is not described herein. FIG. 2*d*-1 and FIG. 2*d*-2 show a structure of a trigger frame in 802.11be.

In a trigger-based transmission procedure, a concept of an adaptive RU is proposed. To be specific, a triggered station may adaptively adjust, based on a detected channel busy/idle status, a size of an RU or an MRU allocated by using a trigger frame, and select an RU or an MRU smaller than that allocated by using the trigger frame for transmission, to avoid a channel that is detected to be busy. Details are described below.

The following describes LDPC in the HT.

Currently, a data field in 802.11 supports a binary convolutional code (binary convolutional code, BCC) encoding manner and an LDPC encoding manner. The following mainly describes an LDPC encoding process in the HT (using 802.11n as an example). In the HT, the LDPC encoding process is mainly divided into five steps, including the following steps.

Step A: Calculate a number of available bits.

The number of available bits in the to-be-sent data field in the STA may be obtained by using the following formula:

$$N_{pld} = \text{length} \times 8 + 16; \quad (1)$$

$$N_{avbits} = N_{CBPS} \times m_{STBC} \times \left\lceil \frac{N_{pld}}{N_{CBPS} \times R \times m_{STBC}} \right\rceil. \quad (2)$$

In the foregoing formulas (1) and (2), $N_{pld}$ indicates a number of bits in the physical layer service data unit (PSDU) and the service field that are not encoded, pld in $N_{pld}$ indicates the payload "payload", and the relationship between the payload and the length value (length) is as described in the foregoing formula; and length is the value of the HT Length field in the HE-SIG field.

In formula (2), $N_{avbits}$ is an initial total number of available encoded bits (avbits represents available bits. For the meaning of "initial", refer to the description about updating in step D. The meaning of $m_{STBC}$ is as follows: When space-time block coding (STBC) is used, the value is 2; or the value is 1. "R" is a bit rate, which indicates a percentage of information bits in the total number of encoded bits.

In formula (2), $\lceil x \rceil$ indicates rounding up; and a total number of symbols obtained through calculation based on the rounding up part and $m_{STBC}$, and then $N_{avbits}$ is obtained based on the number of encoded bits (number of coded bits per symbol, $N_{CBPS}$) supported by each symbol. $N_{CBPS} \times R$ represents a number of bits in the information bits.

Step B: Obtain the codeword number $N_{CW}$ and the codeword length $L_{LDPC}$ based on $N_{avbits}$ in step A.

In step A, the codeword number $N_{CW}$ and the codeword length $L_{LDPC}$ that correspond to $N_{avbits}$ may be obtained by searching the PPDU encoding parameter (PPDU encoding parameters) table shown in Table 2 based on $N_{avbits}$ obtained in step A.

TABLE 2

| Range of $N_{avbits}$ (bits) | Codeword number ($N_{CW}$) for implementing LDPC encoding at an encoding rate of 5/6 | Codeword length (bits) for implementing LDPC encoding at an encoding rate of 5/6 |
|---|---|---|
| $N_{avbits}$ <= 648 | 1 | 1296, if $N_{avbits} \geq N_{pld} + 912 \times (1 - R)$ 648, otherwise |
| 648 < $N_{avbits}$ <= 1296 | 1 | 1944, if $N_{avbits} \geq N_{pld} + 1464 \times (1 - R)$ 1296, otherwise |
| 1296 < $N_{avbits}$ <= 1944 | 1 | 1944 |
| 1944 < $N_{avbits}$ <= 2592 | 2 | 1944, if $N_{avbits} \geq N_{pld} + 2916 \times (1 - R)$ 1296, otherwise |
| 2592 < $N_{avbits}$ | $\left\lceil \frac{N_{PLD}}{1944 \cdot R} \right\rceil$ | 1944 |

In Table 2, the first column of data indicates a value range (Range of $N_{avbits}$), and the unit is bits (bits); the second column of data represents the number of LDPC codewords, which is denoted as $N_{CW}$; and the third column of data represents an LDPC codeword length $L_{LDPC}$, which is denoted as $L_{LDPC}$.

Step C: Calculate a number of to-be-shortened bits based on step A and step B.

After the codeword number $N_{CW}$ and the codeword length $L_{LDPC}$ that correspond to $N_{avbits}$ are obtained in step B, the number of to-be-shortened bits needs to be calculated. These bits are generated because the information bits cannot carry so many bits (the bits carried by the information bits can only be $N_{pld}$). Therefore, although these bits are considered as information bits, these bits are not actual information bits, are set to 0 in an encoding process, and are not transmitted in an actual process. These bits are also referred to as shortened bits. For the meaning of the shortened bits, refer to the following formula:

$$N_{shrt} = \max(0, (N_{CW} \times L_{LDPC} \times R) - N_{pld}). \quad (3)$$

In formula (3), $N_{shrt}$ represents a number of shortened bits, $N_{CW} \times L_{LDPC} \times R$ represents a total number of information bits (or referred to as a number of bits that are not encoded, or referred to as a number of bits without a parity bit), $N_{pld}$ represents a total number of bits that can be supported before encoding is performed, and max(A, B) represents obtaining a maximum value of A and B.

Step D: Calculate a number of to-be-punctured bits.

In an LDPC encoding process of the data field in the HT, puncturing (puncture) needs to be further performed on excess parity bits, as shown in the following formula:

$$N_{punc} = \max(0, (N_{CW} \times L_{LDPC}) - N_{avbits} - N_{shrt}). \quad (4)$$

In formula (4), the following meaning is represented: Number of bits that need to be punctured=Total number of encoded bits−Total number of available bits−Shortened bits, or Number of bits that need to be punctured=0; and max(A, B) represents a maximum value of A and B.

(Total number of encoded bits−Total number of available bits−Total number of shortened bits) may also be understood as (Total number of encoded bits−Total number of shortened bits−Total number of available bits), and represents the number of extra parity bits, that is, the number of parity bits that need to be punctured.

It should be noted that there is a case in which a large number of parity bits need to be punctured, which affects LDPC decoding performance. Therefore, the following manner is used in the HT to update related parameters when a large number of parity bits need to be punctured, as described below.

The updating process of step D is as follows:

Whether a large number of parity bits need to be punctured may be determined based on the following two conditions:

$$\left((N_{punc} > 0.1 \times N_{CW} \times L_{LDPC} \times (1 - R)) \text{ AND } \left(N_{shrt} < 1.2 \times N_{punc} \times \frac{R}{1 - R}\right)\right); \quad \text{Condition 1}$$

$$(N_{punc} > 0.3 \times N_{CW} \times L_{LDPC} \times (1 - R)); \quad \text{Condition 2}$$

The first condition indicates that the number of punctured parity bits exceeds 10% of the total number of the parity bits, and the number of punctured parity bits exceeds a specific proportion of the shortened bits.

The second condition indicates that the number of bits of the parity bits that are punctured exceeds 30% of the total number of bits of the parity bits.

Optionally, implementation of condition 1 and condition 2 in step D is merely an example. The parameter "0.1" may also be replaced with another value (for example, 0.11 or 0.15), and the parameter "30%" may also be replaced with another value (for example, 0.35 or 0.4). The condition is mainly used to determine whether a large number of parity bits are punctured and LDPC decoding performance is affected.

If either of the foregoing conditions is met, it indicates that a large number of bits need to be punctured, and updating needs to be performed as follows:

$$N_{avbits} = N_{avbits} + N_{CBPS} \times m_{STBC}; \quad (5)$$

$$N_{punc} = \max(0, (N_{CW} \times L_{LDPC}) - N_{avbits} - N_{shrt}). \quad (6)$$

The foregoing formula (5) and formula (6) indicate that more symbols are used to carry the parity bits that are previously punctured. This means that the number of punctured bits decreases by $N_{CBPS} \times m_{STBC}$. After the updating process is performed, the initial total number of available encoded bits $N_{avbits}$ in step A is updated, and the number of punctured bits decreases or puncturing no longer needs to be performed, so that the LDPC performance is improved.

Step E: Calculate a number of repeat bits.

The updating process in step D is a case in which some of the parity bits need to be punctured because the total number of available bits is insufficient to support the parity bits (condition 1 or condition 2) in step D. However, selection of different codeword numbers $N_{CW}$ and codeword lengths $L_{LDPC}$ may further result when the total number of bits is much greater than the number of parity bits and the shortened information bits. In this case, a repeat (repeat) operation needs to be performed, as shown in formula (7), to supplement the total number of available bits, so as to improve the performance.

$$N_{rep} = \max(0, N_{avbits} - N_{CW} \times L_{LDPC} \times (1 - R) - N_{pld}). \quad (7)$$

In formula (7), Nrep represents a number of bits that are repeatedly sent.

It should be noted that when a parity bit is punctured ($N_{punc}>0$), the repeating in step E is not performed; or if the repeating in step E is performed, no parity bit is punctured.

Figure 3:
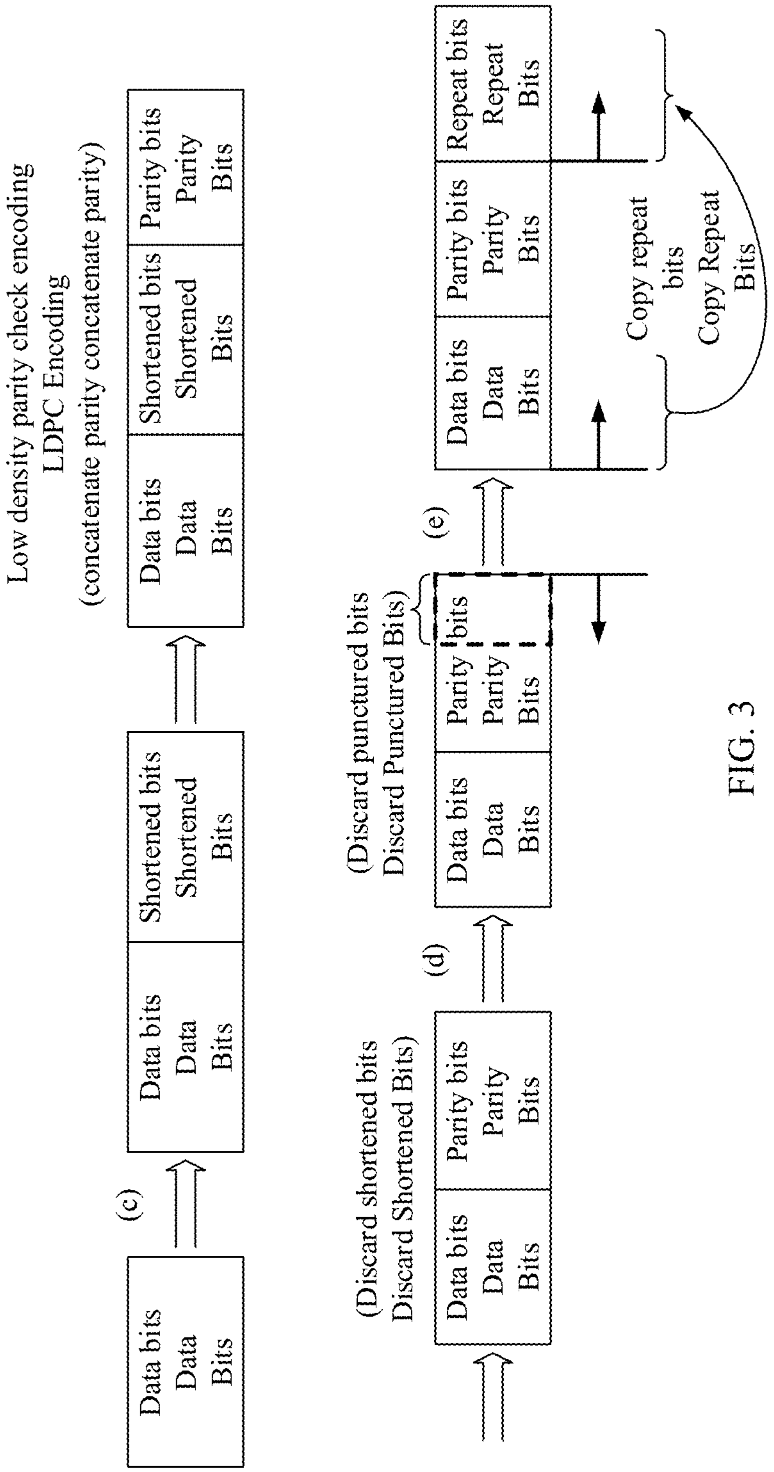
FIG. 3 is a schematic diagram of an LDPC encoding process according to an embodiment of this application.

To describe the foregoing process more clearly, the 802.11 standard further provides the following LDPC encoding process diagram of the data field in the HT, as shown in FIG. 3. In FIG. 3, a process indicated by an arrow in (C) is an implementation process of calculating data bits, calculating shortened bits, and calculating parity bits in a concatenate parity-based manner in LDPC encoding in the foregoing step A, step B, and step C. A code block obtained by discarding shortened bits is located before an arrow in (d). Then, the code block is determined based on condition 1 and condition 2 in the foregoing step D. If the updating process in step D is performed, as shown by the part after an arrow in (d) in FIG. 3, a code block obtained by discarding parity bits (Discard Parity Bits) is obtained; or if the repetition process in step E is performed, as shown by the part after an arrow in (e) in FIG. 3, a code block obtained by copying repeat bits (Copy Repeat Bits) is obtained.

The following describes LDPC in the EHT.

Figure 4:
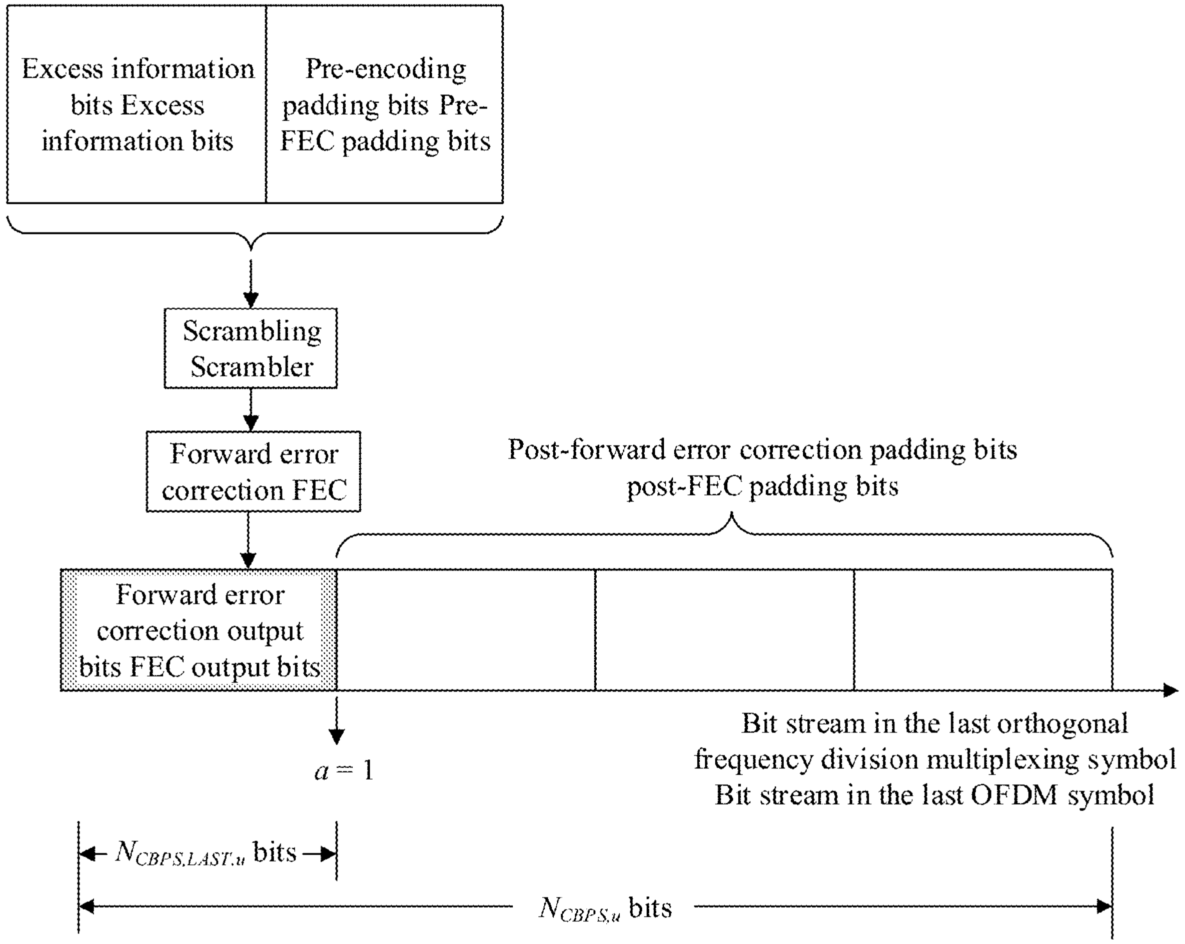
FIG. 4 is a schematic diagram of an LDPC symbol segment according to an embodiment of this application.

Different from the LDPC in the HT, the biggest difference between the LDPC encoding in the EHT is that a segment padding (Padding) is added to the tail of the PPDU. As shown in FIG. 4, a last symbol participating in encoding is displayed. Not all subcarriers participate in encoding, but only some segments are encoded. In this way, only some subcarriers need to be decoded during decoding, thereby reducing overheads. In addition, there may be a packet extension (packet extension, PE) field after the symbol, and the receiver may also be given more processing time.

Specifically, in FIG. 4, scrambling (Scrambler) and forward error correction (FEC) are performed on excess information bits and pre-forward error correction bits (Pre-FEC padding bits) to obtain forward error correction output bits (FEC output bits), which are denoted as $N_{CBPS,LAST,u}$.

Meanings of related parameters in FIG. 4 are as follows:

Excess information bits: indicates excess information bits.

Pre-FEC padding bits: indicates padding bits that are not encoded, which will participate in encoding.

FEC output bits are encoded bits that are output.

Scrambler and FEC represent scrambling and FEC encoding respectively.

Post-FEC padding bits: indicates a number of bits that need to be padded to the total number of encoded bits, and the bits do not participate in encoding.

$N_{CBPS,Last,u}$ indicates a number of encoded bits of the last symbol that participates in encoding.

$N_{CBPS,u}$ indicates a total number of bits of the last symbol that participates in encoding.

In addition, in FIG. 4, a represents a capture location of a code. There are four capture locations in total, that is, a=1, 2, 3, and 4, respectively indicating that FEC output bits occupy about 1/4, 2/4, 3/4, and 1 of the entire symbol. In other words, when a=4, all subcarriers participate in encoding.

Because of the foregoing difference, in step A of LDPC encoding of the data field in the EHT multi-user PPDU (multiple user physical layer protocol data unit, MU PPDU), calculation of formula (1) and formula (2) is changed to calculation of formula (8) and formula (9):

$$N_{pld,u} = (N_{SYM,init} - 1)N_{DBPS,u} + N_{DBPS,last,init,u}; \quad (8)$$

$$N_{avbits,u} = (N_{SYM,init} - 1)N_{CBPS,u} + N_{CBPS,last,init,u}; \quad (9)$$

where $N_{SYM,init}$ represents an initial number of symbols ("initial" is also used here because updating may be performed in step d), and $N_{DBPS,last,init,u}$ represents the data bits that are not encoded (related to a). a and $N_{SYM,init}$ may be obtained through calculation according to the following formula (10) and formula (11).

$$a_{init,u} = \begin{cases} 4, & \text{if } N_{Excess,u=0} \\ \min\left(\left\lceil \frac{N_{Excess,u}}{N_{DBPS,short,u}} \right\rceil, 4\right), & \text{otherwise} \end{cases}; \quad (10)$$

$$N_{SYM,init,u} = \left\lceil \frac{8 \cdot APEP_{LENGTH_u} + N_{tail} + N_{service}}{N_{DBPS}} \right\rceil; \quad (11)$$

where $N_{Excess,u}$ meets the following formula (12):

$$N_{Excess,u} = \mathrm{mod}(8 \cdot APEP_{LENGTH_u} + N_{tail} + N_{service}, N_{DBPS,u}). \quad (12)$$

In the foregoing formula (11) and formula (12), $APEP_{LENGTH_u}$ represents the TXVECTOR parameter APEP_LENGTH of a user u, and $N_{tail}$ represents a number of tail bits of an encoder.

The processes B and C are similar to those in the HT. A corresponding codeword number $N_{CW}$ and a corresponding codeword length $L_{LDPC}$ can be obtained based on $N_{avbits,u}$. If any user meets the determining in step D (that is, excess puncturing), the number of available bits also needs to be increased to place some bits that should be punctured, so as to improve LDPC encoding performance. Correspondingly, condition 1 and condition 2 in the foregoing determining formula are changed to the following condition 3 and condition 4:

$$\left((N_{punc,u} > 0.1 \times N_{CW,u} \times L_{LDPC,u} \times (1 - R_u)) \text{ AND } \left(N_{shrt,u} < 1.2 \times N_{punc,u} \times \frac{R_u}{1 - R_u}\right)\right); \quad \text{Condition 3}$$

$$(N_{punc,u} > 0.3 \times N_{CW,u} \times L_{LDPC,u} \times (1 - R_u)); \quad \text{Condition 4}$$

It should be noted that implementation of condition 3 and condition 4 is merely an example. The parameter "0.1" may also be replaced with another value (for example, 0.11 or 0.15), and the parameter "30%" may also be replaced with another value (for example, 0.35 or 0.4). The condition is mainly used to determine whether there are a large number of punctured parity bits and LDPC decoding performance is affected.

If either of the foregoing conditions is met, updating needs to be performed. An updating method is as follows:

$$\begin{cases} N_{SYM} = N_{SYM,init} + 1 \text{ and } a = 1, & \text{if } a_{init} = 4 \\ N_{SYM} = N_{SYM,init} \text{ and } a = a_{init} + 1, & \text{otherwise} \end{cases}. \quad (13)$$

It should be noted from the foregoing formula (13) that an updating manner in the EHT is no longer the same as that in the HT. In the EHT, the increase is not performed based on a granularity of a symbol, but is performed based on a granularity of a symbol segment. This is because the number of subcarriers supported by each symbol in the EHT is about four times greater than that in the HT. Therefore, the granularity of subcarrier increase is based on the granularity of a symbol segment instead of the granularity of a symbol. It can be learned from the foregoing formula that, when $a_{init}$=4, one symbol needs to be added, and in this case, updated a is equal to 1; however, when $a_{init}$<4, the number of symbols does not need to be increased, and only a segment needs to be added.

If updating does not need to be performed, the values of $N_{SYM}$ and a is the values of $N_{SYM,init}$ and $a_{init}$.

Whether updating is performed may be notified by using an LDPC Extra Symbol Segment subfield in an EHT-SIG of the MU PPDU. For example, when a value of the LDPC Extra Symbol Segment subfield is 1, it indicates that an LDPC extra symbol segment exists, that is, updating is performed; or when a value of the LDPC Extra Symbol Segment subfield is 0, it indicates that no LDPC extra symbol segment exists, that is, updating is not performed.

The foregoing mainly describes, by using formulas (8) to (13), a difference between LDPC encoding of an MU PPDU in the EHT and LDPC encoding of a PPDU in the HT. In addition to the difference, in the HT, a STA independently determines whether to perform transmission based on an extra symbol segment, while in the EHT, an AP indicates, to the STA, whether to perform transmission based on an extra symbol segment.

A process in which LDPC encoding is performed on the TB PPDU in the EHT may also be implemented in an LDPC encoding manner similar to that for the MU PPDU in the EHT. For example, in a process in which LDPC encoding is performed on the TB PPDU in the EHT, the AP may indicate $N_{SYM}$ and a to the STA by using the trigger frame. a is directly given, and $N_{SYM}$ is obtained through comprehensive calculation of a plurality of fields in the trigger frame. It should be noted that the updated $N_{SYM}$ and a instead of the initial $N_{SYM,init}$ and $a_{init}$ are given herein. Then, in a transmission process of the TB PPDU, the AP that sends the trigger frame instead of the STA that sends the TB PPDU determines, based on the LDPC Extra Symbol Segment subfield in the common information field in the trigger frame, whether an extra symbol segment is required.

If the value of LDPC Extra Symbol Segment subfield is 1, the updating process of the following formula (14) is definitely performed:

$$\begin{cases} a_{init} = 4 \text{ and } N_{SYM,init} = N_{SYM} - 1, & \text{if } a = 1 \\ a_{init} = a - 1 \text{ and } N_{SYM,init} = N_{SYM}, & \text{otherwise} \end{cases}. \quad (14)$$

In formula (14), 1 is subtracted from the value of $N_{SYM}$ or 1 is subtracted from the value of $a_{init}$. In addition, 1 is added back in an updating manner of formula (5) and formula (6) in step D described in the HT, or is added back in an updating manner of formula (13) described in the EHT, that is, an extra symbol segment is always added, to avoid excess puncturing.

If the value of the LDPC Extra Symbol Segment subfield is 0, $N_{SYM}$ and a are the initial values and are not updated in the process D.

Other encoding schemes are similar to those described in the HT, and details are not described herein again.

In the foregoing implementation process in the EHT, in a process of transmitting the TB PPDU, the STA determines, based on the value of the LDPC Extra Symbol Segment subfield in the trigger frame sent by the AP, whether there is an extra symbol segment for LDPC encoding. When the value of the LDPC Extra Symbol Segment subfield is 0, there is no extra symbol segment; or when the value of the LDPC Extra Symbol Segment subfield is 1, there is an extra symbol segment.

In this application, an LDPC encoder at a low bit rate may implement a relatively high encoding rate by puncturing more parity bits. The following describes two possible implementations in which an LDPC encoder at a low bit rate implements a relatively high encoding rate by puncturing more parity bits. For example, an LDPC encoder supporting an encoding rate of 5/6 implements an encoding rate of 7/8 by puncturing more parity bits; or an LDPC encoder supporting an encoding rate of 7/8 implements an encoding rate of 11/12 by puncturing more parity bits.

The following describes two possible solutions for an LDPC encoder supporting an encoding rate of 5/6 to implement LDPC encoding at an encoding rate of 7/8 by puncturing more parity bits.

1. The LDPC encoder punctures more parity bits in an approximate puncturing manner, to implement LDPC encoding at an encoding rate of 7/8.

For example, a codeword length is 1944. For an LDPC encoder supporting an encoding rate of 5/6, a length of information bits input to the LDPC encoder is 1944×5/6=1620 bits, and 324 parity bits are output. In other words, the total number of bits is 1944. In a possible implementation, 1620/(7/8)=1851.42, that is, when the codeword length is approximately 1852, the encoding rate is 7/8, and the number of corresponding parity bits is 1852−1620=232. It should be noted that the approximate codeword length is merely an example. Specifically, another codeword length may be used, provided that a proportion of 1620 bits in the codeword length is approximately 7/8. For example, the codeword length may be 1853. Because the number of bits that are input to the LDPC encoder supporting an encoding rate of 5/6 cannot be changed, if the LDPC encoder supporting an encoding rate of 5/6 needs to implement an encoding rate of 7/8, the number of default parity bits that can be punctured by the LDPC encoder is 324−232=92 bits. In other words, after 1620 information bits are input to the encoder supporting an encoding rate of 5/6 to obtain 324 parity bits, the LDPC encoder punctures 92 bits in the 324 parity bits by default, so as to implement LDPC encoding at an encoding rate of 7/8. Because the encoding rate is not a strict 7/8 encoding rate, this manner is referred to as an approximate puncturing manner herein.

2. The LDPC encoder punctures more parity bits through precise puncturing, to implement LDPC encoding at an encoding rate of 7/8.

For example, a codeword length is 1944. For an LDPC encoder supporting an encoding rate of 5/6, a length of information bits input to the LDPC encoder is 1944×5/6=1620 bits, and 324 parity bits are output. In other words, the total number of bits is 1944. To perform precise puncturing, the LDPC encoder selects a maximum value that is less than or equal to 1620 and can be exactly divided by 7. Therefore, it can be learned that 1617/(7/8)=1848, where 1617 is a maximum value that is less than 1620 and can be exactly divided by 7. In other words, when the codeword length is 1848 and the encoding rate is 7/8, the number of corresponding parity bits is 231 bits (1848−1617). Because the number of bits that are input to the LDPC encoder supporting an encoding rate of 5/6 cannot be changed, if the LDPC encoder supporting an encoding rate of 5/6 needs to implement an encoding rate of 7/8, the LDPC encoder may puncture 324−231=93 parity bits by default. In addition, the number of bits input to an LDPC encoder supporting an encoding rate of 5/6 cannot be changed, that is, 1620 information bits need to be input. A difference between 1620 and 1617 is 3, and it may be considered that the 3 bits do not participate in transmission by default. The 3 bits may be referred to as default shortened bits herein. In other words, the 3 bits are all set to 0 and input to the LDPC encoder. It should be noted that, the foregoing shows that the LDPC encoder selects 1617 (that is, a maximum value that is less than 1620 and can be exactly divided by 7) as the number of information bits corresponding to the encoding rate of 7/8. In actual application, the LDPC encoder may alternatively select another value that is less than 1620 and that can be exactly divided by 7, and does not necessarily select a maximum value. This is not specifically limited in this application.

It can be learned from the foregoing two implementations that, to implement LDPC encoding at a high bit rate, an LDPC encoder at a low bit rate needs to puncture more parity bits. Therefore, the codeword length also changes, and the LDPC encoder cannot read the codeword number $N_{CW}$ or the codeword length $L_{LDPC}$ from Table 2. To enable the LDPC encoder to obtain a codeword number and a codeword length that correspond to a high bit rate, using the foregoing precise puncturing manner as an example, for LDPC encoding at an encoding rate of 7/8, a correspondence between available bits $N_{avbits}$, a codeword number $N_{CW}$, and a codeword length $L_{LDPC}$ shown in Table 3 may be used.

TABLE 3

| Range of $N_{avbits}$ | Codeword number for implementing LDPC encoding at an encoding rate of 7/8 | Codeword length for implementing LDPC encoding at an encoding rate of 7/8 |
|---|---|---|
| $N_{avbits}$ <= 616 | 1 | 1232, if $N_{avbits} \geq N_{pld} + 864 \times (1 - R)$<br>616, otherwise |
| 616 < $N_{avbits}$ <= 1232 | 1 | 1848, if $N_{avbits} \geq N_{pld} + 1392 \times (1 - R)$<br>1296, otherwise |
| 1232 < $N_{avbits}$ <= 1848 | 1 | 1848 |
| 1848 < $N_{avbits}$ <= 2464 | 2 | 1848, if $N_{avbits} \geq N_{pld} + 2776 \times (1 - R)$<br>1296, otherwise |
| 2464 < $N_{avbits}$ | $\left\lceil \frac{N_{PLD}}{1848 \cdot R} \right\rceil$ | 1848 |

It can be learned that, if an LDPC encoder at a low bit rate needs to implement LDPC encoding at a high bit rate, the LDPC encoder needs to establish a new correspondence between available bits, a codeword number, and a codeword length at each high bit rate. In other words, Table 2 is no longer applicable when the LDPC encoder implements LDPC encoding at a high bit rate. Therefore, at each encoding rate, the LDPC encoder needs to store a correspondence between available bits, a codeword number, and a codeword length. In other words, a correspondence table is stored. As a result, storage overheads of the LDPC encoder are relatively high.

It can be learned that the default parity bits are parity bits that are punctured by default in a codeword to implement LDPC encoding at a higher encoding rate. To adapt to a length of input information bits of an LDPC encoder at a low bit rate to implement LDPC encoding at a high bit rate, extra bits are added to information bits of a codeword to meet the length of input information bits. The extra bits herein may be referred to as default shortened bits in the codeword. For example, it can be learned from the foregoing precise puncturing manner that a codeword length of the LDPC encoder is 1848 at an encoding rate of 5/6, and the number of corresponding information bits is 1617. The number of input information bits (that is, 1620 bits) of the LDPC encoder supporting an encoding rate of 5/6 cannot be changed. A difference between 1620 and 1617 is 3, and it may be considered that the 3 bits do not participate in transmission by default. The 3 bits may be referred to as default shortened bits herein. The 1617 bits and the three default shortened bits are input to the encoder supporting an encoding rate of 5/6 as the input information bits. Values of the three default shortened bits may all be 0.

The following describes a case in which the number of parity bits that need to be punctured by the LDPC encoder at a high bit rate in a solution in which the LDPC encoder at a low bit rate implements LDPC encoding at a high bit rate is $N_{punc,high\ bit\ rate}$ max $(0, (N_{CW,high\ bit\ rate} \times L_{LDPC,high\ bit\ rate}) - N_{avbits,high\ bit\ rate} - N_{shrt,high\ bit\ rate})$. $N_{CW,high\ bit\ rate}$ is a corresponding codeword number when the LDPC encoder implements LDPC encoding at a high bit rate. $L_{LDPC,high\ bit\ rate}$ is a corresponding codeword length when the LDPC encoder implements LDPC encoding at a high bit rate. $N_{avbits,high\ bit\ rate}$ is a corresponding number of available bits when the LDPC encoder implements LDPC encoding at a high bit rate. $N_{shrt,high\ bit\ rate}$ is a number of shortened bits included in the codeword corresponding to the first codeword number when the LDPC encoder implements LDPC encoding at a high bit rate.

For example, it can be learned from Table 3 that a high bit rate is 7/8, and $N_{avbits,high\ bit\ rate}$ falls within an interval of (616, 1232]. It can be learned that $N_{CW,high\ bit\ rate}$ is 1 and $L_{LDPC,high\ bit\ rate}$ is 1848. It can be learned that $N_{shrt,high\ bit\ rate}$ may be obtained through calculation according to the foregoing formula (3).

The following describes several possible cases for different values of $N_{punc,high\ bit\ rate}$.

1. If $N_{punc,high\ bit\ rate}>0$, it indicates a number of parity bits that need to be punctured in the codeword corresponding to a low bit rate, except the default parity bits.
2. If $N_{punc,high\ bit\ rate}=0$, it indicates a number of parity bits that do not need to be punctured in the codeword corresponding to a low bit rate, except the default parity bits. In addition, the number of required repeat bits is less than or equal to the number of default parity bits. For a codeword, the repeat bits in the codeword are repeated starting from a start bit of default parity bits in the codeword.
3. If $N_{punc,high\ bit\ rate}=0$, it indicates the number of parity bits that do not need to be punctured in the codeword corresponding to a low bit rate, except the default parity bits. In addition, the number of required repeat bits is greater than the number of default parity bits. For a codeword, repeat bits in the codeword are repeated starting from a start bit of default parity bits in the codeword to a last bit of the default parity bits in the codeword, and then the repeat bits in the codeword are repeated starting from information bits in the codeword.

According to an encoding method provided in this application, an encoding apparatus determines first payload bits, where the first payload bits are to-be-encoded data bits. The encoding apparatus determines first available bits based on the first payload bits and a first encoding rate; and then the encoding apparatus determines a second codeword number and a second codeword length based on the first available bits and a first correspondence. The first correspondence is a correspondence between the first available bits, a first codeword number, and a first codeword length of the encoding apparatus at the first encoding rate, the second codeword number is obtained based on the first codeword number, and the second codeword length is obtained based on the first codeword length. Therefore, the encoding apparatus determines the second codeword number and the second codeword length based on the first correspondence and the first available bits, so that the encoding apparatus does not need to store a correspondence between available bits, a codeword number, and a codeword length at a second encoding rate, thereby reducing storage overheads of the encoding apparatus. For example, the encoding apparatus may obtain, based on a correspondence between the first available bits at the first encoding rate (a relatively low encoding rate), the first codeword number, and the first codeword length, a codeword length and a codeword number that correspond to a relatively high encoding rate. The encoding apparatus does not need to store a correspondence between available bits, a codeword number, and a codeword length at a relatively high encoding rate, thereby reducing storage overheads of the encoding apparatus. For details, refer to related descriptions in the embodiment shown in FIG. 5 below.

The following describes some technical terms used in this application.

1. Default parity bits are parity bits that are punctured by default in a codeword by an encoding apparatus supporting a first encoding rate to implement LDPC encoding at a second encoding rate. Each codeword has corresponding default parity bits.
2. Default shortened bits: To adapt to a length of input information bits of an encoding apparatus supporting a first encoding rate to meet a requirement of LDPC encoding at a second encoding rate, extra bits are added to information bits of a codeword to meet a length of input information bits, and then the information bits are input to the encoding apparatus. The extra bits may be set to 0, and the extra bits may be referred to as default shortened bits in the codeword.
3. Real parity bits are parity bits other than default parity bits of a codeword. Alternatively, when some parity bits need to be punctured in addition to the default parity bits in the codeword, the real parity bits include parity bits in the codeword other than the default parity bits and the parity bits that need to be punctured.

The technical solutions of this application are described below with reference to specific embodiments.

Figure 5:
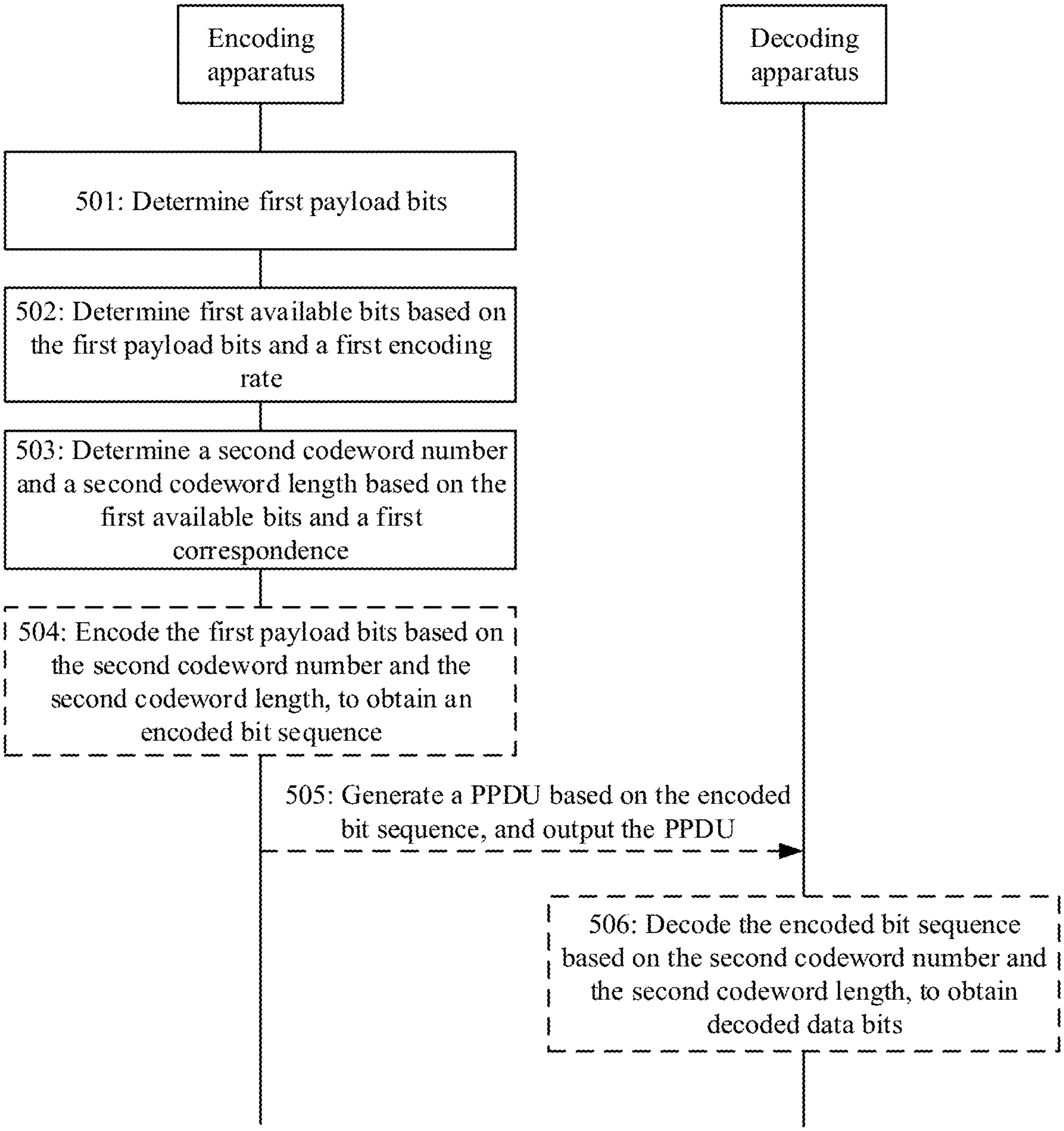
FIG. 5 is a schematic diagram of an embodiment of an encoding method and a decoding method according to an embodiment of this application.

FIG. 5 is a schematic diagram of another embodiment of an encoding method according to an embodiment of this application. Refer to FIG. 5. The method includes the following steps.

501: An encoding apparatus determines first payload bits. The first payload bits are to-be-encoded data bits.

The following describes two possible implementations in which the encoding apparatus determines the first payload bits. Other implementations are still applicable to this application. This is not specifically limited in this application.

1. The encoding apparatus determines the first payload bits $N_{pld}$, based on the foregoing formula (8) (that is, $N_{pld,u}=(N_{SYM,init}-1)N_{DBPS,u}+N_{DBPS,last,init,u}$).
2. The encoding apparatus determines the first payload bits based on the corresponding available bits $N_{avbits,real}$ at a second encoding rate and the second encoding rate.

$$N_{pld,1} = N_{avbits,real} * R_{high}$$

where $N_{pld,1}$ is a number of first payload bits, $N_{avbits,real}$ is a corresponding number of available bits of the encoding apparatus at the second encoding rate, and $R_{high}$ is the second encoding rate. $N_{avbits,real}$ may be obtained through calculation according to the foregoing formula (9).

It should be noted that the encoding apparatus supports a first encoding rate. In this application, when performing encoding at the first encoding rate, the encoding apparatus implements LDPC encoding at the second encoding rate by puncturing more parity bits (referred to as default parity bits in this specification). For example, the first encoding rate is 5/6, and the second encoding rate is 7/8; or the first encoding rate is 7/8, and the second encoding rate is 11/12.

Optionally, in the 802.11n standard, the first payload bits are bits in a PSDU and a service field that are not encoded. In the 802.11be standard, the first payload bits are bits in a PSDU, a service field, and pre-forward error correction padding bits that are not encoded.

502: The encoding apparatus determines the first available bits based on the first payload bits and the first encoding rate.

The first encoding rate is an encoding rate supported by the encoding apparatus. For example, the first encoding rate is 5/6.

In a current communication standard, the encoding apparatus determines available bits $N_{avbits}$, and determines a codeword number $N_{CW}$ and a codeword length $L_{LDPC}$ based on a correspondence between available bits $N_{avbits}$, the codeword number $N_{CW}$, and the codeword length $L_{LDPC}$. For the determining, by the encoding apparatus, the available bits $N_{avbits}$, refer to the foregoing formula (8) and formula (9). However, if the encoding apparatus uses a manner of obtaining the codeword number $N_{CW}$ and the codeword length $L_{LDPC}$ in a current communication standard, if the encoding apparatus supporting the first encoding rate needs to implement LDPC encoding at the second encoding rate, the encoding apparatus needs to establish a new correspondence between the available bits, the codeword number $N_{CW}$, and the codeword length $L_{LDPC}$ at the second encoding rate. Therefore, at different second encoding rates, the encoding apparatus needs to store a correspondence between available bits, a codeword number, and a codeword length. As a result, storage overheads of the encoding apparatus are relatively high.

However, in the technical solution of this application, the encoding apparatus determines the first available bits based on the first payload bits and the first encoding rate. The first available bits may be understood as middle available bits. Therefore, the encoding apparatus may still obtain a second codeword number and a second codeword length based on the first correspondence in step 503. The first correspondence is a correspondence between the first available bits, a first codeword number, and a first codeword length of the encoding apparatus at the first encoding rate. The second codeword number is a codeword number corresponding to the second encoding rate of the encoding apparatus, and the second codeword length is a codeword length corresponding to the second encoding rate of the encoding apparatus. In other words, a codeword number and a codeword length that are used by the encoding apparatus when the encoding apparatus at the first encoding rate implements LDPC encoding at the second encoding rate. In this way, the encoding apparatus does not need to establish a new correspondence between available bits, a codeword number, and a codeword length at the second encoding rate, thereby reducing storage overheads of the encoding apparatus.

The following describes two possible implementations of step 502. Other implementations are still applicable to this application. This is not specifically limited in this application.

Implementation 1: The encoding apparatus multiplies the number of first payload bits by a first encoding rate to obtain the first available bits.

The following uses a formula to represent a relationship between the first payload bits, the first encoding rate, and the first available bits.

$$N_{avbits,middle} = \frac{N_{pld1}}{R_{low}} \tag{15}$$

where $N_{avbits,middle}$ indicates a number of first available bits, $N_{pld1}$ is the number of first payload bits, and $R_{low}$ is the first encoding rate.

Figure 6:
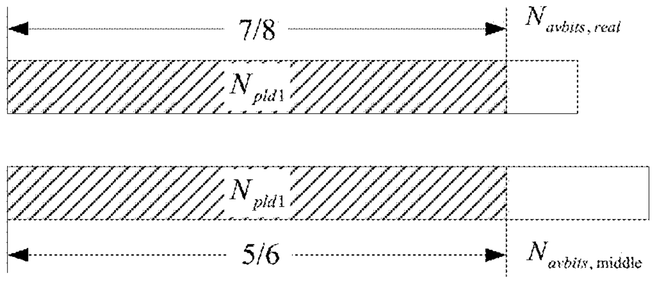
FIG. 6 is a schematic diagram of first available bits according to an embodiment of this application.

It can be learned from the foregoing formula (15) that, in implementation 1, the encoding apparatus determines the first available bits based on the first encoding rate. It should be noted that the number of first available bits $N_{avbits,middle}$ determined by the encoding apparatus according to the foregoing formula (15) are greater than the number of available bits $N_{avbits,real}$ actually corresponding to the second encoding rate. For example, as shown in FIG. 6, if the number of first payload bits $N_{pld1}$ is given, the corresponding available bits at the second encoding rate of 7/8 are $N_{avbits,real}$. $N_{avbits,real}$ may be specifically obtained through calculation according to the foregoing formula (9). The encoding apparatus determines, according to implementation 1, that the number of first available bits at the first encoding rate of 5/6 is $N_{avbits,middle}$. It can be learned from FIG. 6 that $N_{avbits,middle}$ is greater than $N_{avbits,real}$. In other words, the encoding apparatus obtains middle available bits through calculation based on the first encoding rate, so that the encoding apparatus may still determine, based on the first correspondence, the second codeword number and the second codeword length that correspond to the second encoding rate.

It should be noted that, in the foregoing formula (15), if $$\frac{N_{pld1}}{R_{low}}$$

is not an integer, the number of first available bits $N_{avbits,middle}$ may be directly equal to $$\frac{N_{pld1}}{R_{low}};$$

or if $$\frac{N_{pld1}}{R_{low}}$$

is not an integer, the number of first available bits $N_{avbits,middle}$ may be obtained by rounding up $$\frac{N_{pld1}}{R_{low}};$$

or if $$\frac{N_{pld1}}{R_{low}}$$

is not an integer, the number of first available bits $N_{avbits,middle}$ may be obtained by rounding down $$\frac{N_{pld1}}{R_{low}};$$

or if $$\frac{N_{pld1}}{R_{low}}$$

is not an integer, the encoding apparatus may perform a rounding operation on $$\frac{N_{pld1}}{R_{low}}$$

and use an obtained integer as the number of first available bits $N_{avbits,middle}$.

Implementation 2: The encoding apparatus determines the first available bits based on the first payload bits, the first encoding rate, and the first ratio. The first ratio is equal to a ratio of a number of first information bits to a number of second information bits. The first information bits are information bits corresponding to a codeword of the encoding apparatus at the second encoding rate. The second information bits are information bits corresponding to a codeword of the encoding apparatus at the first encoding rate. The number of first information bits is equal to the number of second information bits minus the number of default shortened bits required by a codeword.

In this implementation, the encoding apparatus supports the first encoding rate, and the number of information bits input to the encoding apparatus is unchangeable. For example, as described in the foregoing related description of the precise puncturing manner, for the LDPC encoder supporting an encoding rate of 5/6, a length of input information bits of the encoding apparatus is 1944×5/6=1620 bits, and 324 parity bits are output. To perform precise puncturing, the encoding apparatus selects a maximum value that is less than or equal to 1620 and can be exactly divided by 7. Therefore, it can be learned that 1617/(7/8)=1848, where 1617 is a maximum value that is less than 1620 and can be exactly divided by 7. A difference between 1620 and 1617 is 3, and it may be considered that the 3 bits do not participate in transmission by default. The 3 bits may be referred to as default shortened bits herein. In other words, in this case, to adapt to a length of input information bits of the encoding apparatus and a requirement for implementing LDPC encoding at the second encoding rate, the codeword includes default shortened bits. In this example, the number of first information bits is 1617, and the number of second information bits is 1620. Therefore, the first ratio is equal to 1617/1620. The encoding apparatus determines the first available bits based on the first encoding rate, the first payload bits, and the first ratio. In other words, the encoding apparatus obtains middle available bits through calculation based on the first encoding rate, so that the encoding apparatus may still determine, based on the first correspondence and the first available bits, the second codeword number and the second codeword length that correspond to the second encoding rate. In this way, the encoding apparatus at the first encoding rate implements LDPC encoding at the second encoding rate in a precise puncturing manner.

The following shows an implementation in which the encoding apparatus determines the first available bits based on the first payload bits, the first encoding rate, and the first ratio with reference to a specific formula.

$$N_{avbits,middle} = \frac{N_{pld1}}{r_{pld}R_{low}} \tag{16}$$

where $N_{avbits,middle}$ is the number of first available bits, $N_{pld1}$ is the number of first payload bits, $R_{low}$ is the first encoding rate, and $r_{pld}$ is the first ratio.

Figure 7:
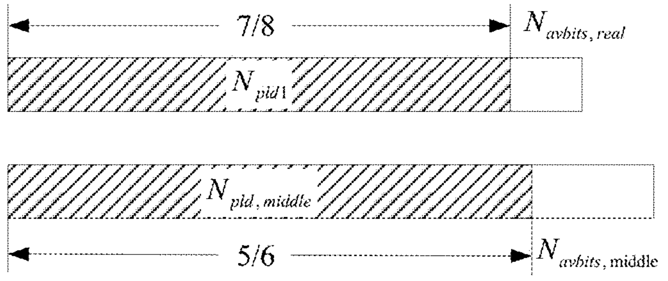
FIG. 7 is another schematic diagram of first available bits according to an embodiment of this application.

It can be learned from the foregoing formula (16) that, in implementation 1, the encoding apparatus determines the first available bits based on the first encoding rate and the first ratio. If the codeword at the second encoding rate includes default shortened bits, the encoding apparatus should extend the default shortened bits in the codeword to the first middle payload bits $$N_{pld1,middle} = \frac{N_{pld1}}{r_{pld}}$$

for restoring the default shortened bits. As shown in FIG. 7, the number of first middle payload bits $N_{pld1,middle}$ is greater than the number of first payload bits $N_{pld1}$.

For example, it can be learned from the foregoing example that the number of first information bits is 1617, and the number of second information bits is 1620. Therefore, $r_{pld}$=1617/1620.

The encoding apparatus determines the first available bits based on the first encoding rate and the first payload bits. It should be noted that the number of first available bits $N_{avbits,middle}$ determined by the encoding apparatus according to the foregoing formula (16) are greater than the number of available bits $N_{avbits,real}$ actually corresponding to the second encoding rate. For example, as shown in FIG. 7, if the number of first payload bits $N_{pld1}$ is given, the corresponding available bits at the second encoding rate of 7/8 are $N_{avbits,real}$. The encoding apparatus determines, according to implementation 2, that the number of first available bits at the first encoding rate of 5/6 is $N_{avbits,middle}$. It can be learned from FIG. 7 that $N_{avbits,middle}$ is greater than $N_{avbits,real}$. In other words, the encoding apparatus obtains middle available bits through calculation based on the first encoding rate, so that the encoding apparatus may still determine, based on the first correspondence, the second codeword number and the second codeword length that correspond to the second encoding rate.

It should be noted that, if $$\frac{N_{pld1}}{r_{pld}}$$

is not an integer, the number of first middle payload bits $N_{pld1,middle}$ may be directly equal to $$\frac{N_{pld1}}{r_{pld}};$$

or if $$\frac{N_{pld1}}{r_{pld}}$$

is not an integer, the number of first middle payload bits $N_{pld1,middle}$ may be obtained by rounding up $$\frac{N_{pld1}}{r_{pld}};$$

or if $$\frac{N_{pld1}}{r_{pld}}$$

is not an integer, the number of first middle payload bits $N_{pld1,middle}$ may be obtained by rounding down $$\frac{N_{pld1}}{r_{pld}};$$

or if $$\frac{N_{pld1}}{r_{pld}}$$

is not an integer, the encoding apparatus may perform a rounding operation on $$\frac{N_{pld1}}{r_{pld}}$$

and use an obtained integer as the number of first middle payload bits $N_{pld1,middle}$.

It should be noted that, optionally, in the foregoing formula (15), if $$\frac{N_{pld1}}{r_{pld}R_{low}}$$

is not an integer, the number of first available bits $N_{avbits,middle}$ may be directly equal to $$\frac{N_{pld1}}{r_{pld}R_{low}};$$

or if $$\frac{N_{pld1}}{r_{pld}R_{low}}$$

is not an integer, the number of first available bits $N_{avbits,middle}$ may be obtained by rounding up $$\frac{N_{pld1}}{r_{pld}R_{low}};$$

or if $$\frac{N_{pld1}}{r_{pld}R_{low}}$$

is not an integer, the number of first available bits $N_{avbits,middle}$ may be obtained by rounding down $$\frac{N_{pld1}}{r_{pld}R_{low}};$$

or if $$\frac{N_{pld1}}{r_{pld}R_{low}}$$

is not an integer, the encoding apparatus may perform a rounding operation on $$\frac{N_{pld1}}{r_{pld}R_{low}}$$

and use an obtained integer as the number of first available bits $N_{avbits,middle}$.

Implementation 2 focuses on a case in which a codeword needs default shortened bits because of inconsistent encoding rates in the solution of the precise puncturing manner. However, not all codewords in the solution of the precise puncturing manner need default shortened bits. If the number of information bits of the encoding apparatus at the second encoding rate is the same as the number of information bits of the encoding apparatus at the first encoding rate, it may be considered that there is no default shortened bit in the codeword. In this case, the value of the first ratio in implementation 2 is 1. In other words, implementation 2 is similar to implementation 1.

503: The encoding apparatus determines the second codeword number and the second codeword length based on the first available bits and a first correspondence.

The first correspondence is a correspondence between the first available bits, a first codeword number, and a first codeword length of the encoding apparatus at the first encoding rate. The second codeword length is obtained based on the first codeword number, and the second codeword length is obtained based on the first codeword length.

The first codeword number is a codeword number of the encoding apparatus at the first encoding rate, and may be specifically understood as a corresponding codeword number when the encoding apparatus encodes the first payload bits at the first encoding rate. The first codeword length is a codeword length of the encoding apparatus at the first encoding rate, and may be specifically understood as a corresponding codeword length when the encoding apparatus encodes the first payload bits at the first encoding rate.

The following describes step 503 with reference to step 503*a* and step 503*b*.

503*a*: The encoding apparatus determines, from the first correspondence, the first codeword number and the first codeword length that correspond to the first available bits.

For example, the first encoding rate is 5/6, and the value of R in Table 2 is 5/6. The encoding apparatus determines, from Table 2, the first codeword number $N_{CW1}$ and the first codeword length $L_{LDPC1}$ based on the first available bits $N_{avbits,middle}$.

503*b*: The encoding apparatus uses the first codeword number as the second codeword number.

503*c*: The encoding apparatus updates the first codeword length as the second codeword length.

The following describes step 503*c* with reference to implementation 1 and implementation 2 of step 502.

Based on implementation 1 of step 502, that the encoding apparatus updates the first codeword length to obtain the second codeword length includes:

$$L_{LDPC2} = L_{LDPC1} - N_{punc\_per\_cw\_default}$$

where $L_{LDPC2}$ is the second codeword length, $L_{LDPC1}$ is the first codeword length, and $N_{punc\_per\_cw\_default}$ is a number of default parity bits that need to be punctured in a codeword by the encoding apparatus at a second encoding rate.

For example, the first encoding rate is 5/6, and the second encoding rate is 7/8. It can be learned from the foregoing solution of the approximate puncturing manner that the first codeword length $L_{LDPC1}$ is 1944, and the number of default parity bits that need to be in a codeword is 92 bits. Therefore, the second codeword length $L_{LDPC2}$=1944−92=1852 bits.

Based on implementation 2 of step 502, that the encoding apparatus updates the first codeword length to obtain the second codeword length includes:

$$L_{LDPC2} = L_{LDPC1} - N_{punc\_per\_cw\_default} - N_{short\_per\_cw\_default}$$

where $L_{LDPC2}$ is the second codeword length, $L_{LDPC1}$ is the first codeword length, $N_{punc\_per\_cw\_default}$ is a number of default parity bits that need to be punctured in a codeword by the encoding apparatus at a second encoding rate, and $N_{short\_per\_cw\_default}$ is a number of default shortened bits required by a codeword of the encoding apparatus at the second encoding rate.

For example, the first encoding rate is 5/6, and the second encoding rate is 7/8. It can be learned from the foregoing solution of the precise puncturing manner that the first codeword length $L_{LDPC1}$ is 1944. The number of default parity bits that need to be punctured in a codeword by the encoding apparatus at a second encoding rate is 93. The number of default shortened bits required by the encoding apparatus for a codeword at the second encoding rate is 3. Therefore, the second codeword length $L_{LDPC2}$=1944−93−3=1848 bits.

Optionally, the second codeword number is a codeword number of the encoding apparatus at the second encoding rate, and may be specifically understood as a codeword number used by the encoding apparatus when the encoding apparatus encodes the first payload bits at the first encoding rate and implements LDPC encoding at the second encoding rate by puncturing more parity bits (referred to as default parity bits in this specification).

Optionally, the second codeword length is a codeword length of the encoding apparatus at the second encoding rate, and may be specifically understood as a codeword length used by the encoding apparatus when the encoding apparatus encodes the first payload bits at the first encoding rate and implements LDPC encoding at the second encoding rate by puncturing more parity bits (referred to as default parity bits in this specification).

For example, the first encoding rate is 5/6, and the second encoding rate is 7/8. The first codeword length is 1944, and the encoding apparatus punctures 92 bits (that is, default parity bits) to implement LDPC encoding at the second encoding rate. It can be learned that the second codeword length is 1944−92=1852 bits.

Optionally, the first encoding rate is greater than the second encoding rate. For example, the first encoding rate is 5/6, and the second encoding rate is 7/8; or the first encoding rate is 7/8, and the second encoding rate is 11/12.

It can be learned that the encoding apparatus determines the second codeword number and the second codeword length based on the first available bits and the correspondence between the first available bits at the first encoding rate (a lower encoding rate), the first codeword number, and the first codeword length. In other words, the encoding apparatus may obtain a codeword length and a codeword number that correspond to a relatively high encoding rate. Therefore, the encoding apparatus does not need to store a correspondence between available bits, a codeword number, and a codeword length at a relatively high encoding rate, thereby reducing storage overheads of the encoding apparatus.

It should be noted that in this specification, an example in which the first codeword length is 1944 is mainly used for description. In actual application, the first codeword length is not limited in this application. For example, the first codeword length may alternatively be 648 or 1296.

This specification is mainly described by using an example in which the first codeword length is 1944, the first encoding rate is 5/6, and a length of input information bits of the encoding apparatus is 1620. In actual application, the first encoding rate may be 3/4, 1/2, or the like. Correspondingly, the number of input information bits of the encoding apparatus adapts to the first encoding rate. This is not specifically limited in this application.

Optionally, the embodiment shown in FIG. 5 further includes step 504 to step 506. Step 504 to step 506 may be performed after step 503.

504: The encoding apparatus encodes the first payload bits based on the second codeword number and the second codeword length, to obtain an encoded bit sequence.

For example, the first encoding rate is 5/6, the first codeword length is 1944, and the first codeword number is 1. 1620 information bits are input to the encoding apparatus, which outputs 324 parity bits. The first payload bits are data bits in the 1620 information bits. To implement LDPC encoding at the second encoding rate, the encoding apparatus determines, through 501 to step 503, that the second codeword number is 1 and the second codeword length is 1852. The encoding apparatus may determine that the default parity bits in the codeword are 1944−1852=92 bits. After the encoding apparatus punctures the 92 default parity bits, the encoding apparatus processes the 1852 bits after the 92 default parity bits are punctured (including determining whether the parity bits in the codeword need to be punctured, or whether repeat bits need to be copied), to obtain the encoded bit sequence.

Specifically, the encoding apparatus may determine the number of first parity bits. The number of first parity bits is determined based on the second codeword number, the second codeword length, and the first payload bits. It may be understood that the number of first parity bits is the number of parity bits that need to be punctured in a codeword corresponding to the second codeword number when the default parity bits in the codeword corresponding to the first codeword number are not considered.

In a possible implementation, with reference to the foregoing formula (6), it can be learned that the number of first parity bits is $N_{punc2}=\max(0, (N_{CW2}\times L_{LDPC2})-N_{avbits,real}-N_{shrt2})$, where $N_{CW2}$ is the second codeword number, $L_{LDPC2}$ is the second codeword length, $N_{avbits,real}$ is the number of available bits of the encoding apparatus at the second encoding rate, $N_{avbits,real}$ may be calculated according to the foregoing formula (9), and $N_{shrt2}$ is the number of shortened bits included in a codeword corresponding to the second codeword number.

If the number of first parity bits is 0, it indicates that, in the codeword corresponding to the first codeword number, the parity bits do not need to be punctured, except the default parity bits. If the number of first parity bits is greater than 0, it indicates that in the codeword corresponding to the first codeword number, the parity bits need to be punctured, in addition to the default parity bits.

The foregoing step 504 includes: If the number of first parity bits is 0, the encoding apparatus determines the repeat bits in the codeword corresponding to the first codeword number. The encoding apparatus may determine, with reference to the foregoing formula (7), the number of repeat bits in the codeword corresponding to the first codeword number. In other words, the number of repeat bits in the codeword corresponding to the first codeword number is $N_{rep2}=\max(0, N_{avbits,real}-N_{CW2}\times L_{LDPC2}\times(1-R_{high})-N_{pld1})$, where $N_{CW2}$ is the second codeword number, $L_{LDPC2}$ is the second codeword length, $N_{avbits,real}$ is the number of available bits of the encoding apparatus at the second encoding rate, and $R_{high}$ is the second encoding rate.

Codewords corresponding to the first codeword number include the first codeword. The following describes two possible implementations in which the encoding apparatus determines the repeat bits in the first codeword by using the first codeword as an example. A manner of determining repeat bits in another codeword in the codeword corresponding to the first codeword number is also applicable.

Implementation 1: If the number of first parity bits is 0, the encoding apparatus determines the repeat bits in the first codeword. The repeat bits in the first codeword are repeated starting from the start bit of data bits in the first codeword. The first payload bits include data bits in the first codeword.

In implementation 1, the repeat bits in the first codeword are repeated starting from a start bit of data bits in the first codeword, and the default parity bits in the first codeword do not need to be restored.

Optionally, an end location of repetition of the repeat bits in the first codeword is any one of the following: an end bit of the data bits in the first codeword, an end bit of the real parity bits in the first codeword, or an end bit of the default parity bits in the first codeword.

Implementation 2: If the number of first parity bits is 0, the encoding apparatus determines the repeat bits in the first codeword. The repeat bits in the first codeword are repeated starting from a start bit of default parity bits in the first codeword. The first payload bits include data bits in the first codeword. When neither a first condition nor a second condition is met, the repeat bits in the first codeword are repeated starting from a start bit of data bits in the first codeword.

The first condition includes: the number of second parity bits is greater than a product of a first value and the number of third parity bits.

The number of second parity bits is the number of parity bits that need to be punctured in the codeword corresponding to the first codeword number by the encoding apparatus at the first encoding rate. The number of second parity bits is determined based on the first codeword number, the first codeword length, and the first payload bits. It may be understood that the number of second parity bits is the number of parity bits that need to be punctured in the codeword corresponding to the first codeword number when the default parity bits in the codeword corresponding to the first codeword number are not considered.

The number of third parity bits is the number of parity bits included in the codeword corresponding to the first codeword number of the encoding apparatus at the first encoding rate. It may be understood that the number of third parity bits is the number of parity bits included in the codeword corresponding to the first codeword number when the default parity bits in the codeword corresponding to the first codeword number are not considered.

The first value is greater than or equal to the first threshold. For example, the first threshold may be 0.3.

In a possible implementation, with reference to the foregoing formula (6), it can be learned that:

$$N_{punc1} = \max(0, (N_{CW1} \times L_{LDPC1}) - N_{avbits1} - N_{shrt1}) \tag{17}$$

where $N_{punc1}$ is a number of second parity bits, $N_{CW1}$ is the first codeword number, and $L_{LDPC1}$ is the first codeword length. $N_{avbits1}$ is a number of available bits of the encoding apparatus at the first encoding rate. For a specific calculation manner, refer to the foregoing formula (9). $N_{shrt1}$ is a number of shortened bits included in a codeword corresponding to the first codeword number of the encoding apparatus at the first encoding rate. For a specific calculation manner, refer to the foregoing formula (3). $N_{CW1}$, $L_{LDPC1}$, RIO, and $N_{pld1}$ are substituted into formula (3) to obtain $N_{shrt1}$.

The number of third parity bits is equal to $N_{CW1}\cdot L_{LDPC1}\cdot(1-R_{low})$, where $N_{CW1}$ is the first codeword number, $L_{LDPC1}$ is the first codeword length, and $R_{low}$ is the first encoding rate.

In this implementation, the first condition may be represented as the following formula (18).

$$N_{punc1} > 0.3 \cdot N_{CW1} \cdot L_{LDPC1} \cdot (1 - R_{low}) \tag{18}$$

For example, the first encoding rate is 5/6, the first codeword number $N_{CW1}$ is 1, and the first codeword length $L_{LDPC1}$ is 1944. The number of third parity bits is 324.

If the number of second parity bits is greater than 0.3×324, it indicates that the first condition is met. If the number of second parity bits is less than 0.3×324, it indicates that the first condition is not met. The second condition includes: the number of second parity bits is greater than a product of a second value and the number of third parity bits, and a ratio of the number of first shortened bits to the number of second parity bits is less than a product of a first weight factor and a second threshold. The second value is greater than or equal to a third threshold. For example, the third threshold is 0.1, and the first weight factor is 1.2. The second threshold is determined based on the first encoding rate.

The number of first shortened bits is the number of shortened bits included in a codeword corresponding to a first codeword number when the encoding apparatus performs encoding at a first encoding rate. It may be understood that the number of first shortened bits is the number of shortened bits included in the codeword corresponding to the first codeword number when the default shortened bits in the codeword corresponding to the first codeword number are not considered.

In a possible implementation, for a calculation manner of the number of first shortened bits $N_{shrt1}$, refer to the foregoing related descriptions. The second condition may be represented as the following formula (19) and formula (20).

$$N_{punc1} > 0.1 \cdot N_{CW1} \cdot L_{LDPC1} \cdot (1 - R_{low}) \tag{19}$$

where the second value is 0.1, $N_{punc1}$ is the number of second parity bits, and the number of third parity bits is $N_{CW1} \cdot L_{LDPC1} \cdot (1-R_{low})$.

$$\frac{N_{shrt1}}{N_{punc1}} < 1.2 \cdot \frac{R_{low}}{(1 - R_{low})} \tag{20}$$

where $N_{shrt1}$ is the number of first shortened bits, $N_{punc1}$ is the number of second parity bits, and $R_{low}$ is the first encoding rate.

$$\frac{R_{low}}{(1 - R_{low})}$$

is the second threshold. The second threshold is determined based on the first encoding rate.

In implementation 2, optionally, an end location of repetition of the repeat bits in the first codeword is any one of the following: an end bit of the data bits in the first codeword, an end bit of the real parity bits in the first codeword, or an end bit of the default parity bits in the first codeword.

In implementation 2, when neither the first condition nor the second condition is met, the encoding apparatus may consider that performance of parity bit puncturing is not greatly affected, and the repeat bits in the first codeword may be repeated starting from the start bit of data bits in the first codeword, and the default parity bits in the first codeword do not need to be restored. In this case, restoring some default parity bits brings little performance gain. The repeat bits in the first codeword may be repeated starting from the start bit of data bits in the first codeword. This improves decoding accuracy on a decoding apparatus side, thereby improving decoding performance.

The foregoing describes a solution in which the encoding apparatus determines repeat bits when the number of first parity bits is 0. The following describes two possible implementations in which the encoding apparatus determines to add an LDPC extra symbol segment after the encoding apparatus determines the number of first parity bits.

Implementation 1: If a third condition and/or a fourth condition are/is met, the encoding apparatus determines to add an LDPC extra symbol segment.

The third condition includes: the number of first parity bits is greater than a product of a first value and the number of fourth parity bits.

The first value is greater than or equal to the first threshold. For example, the first threshold is 0.3.

The number of first parity bits is determined based on the second codeword number, the second codeword length, and the first payload bits. For the number of first parity bits, refer to the foregoing related descriptions.

The number of fourth parity bits is the number of parity bits included in a codeword corresponding to the second codeword number of the encoding apparatus at the second encoding rate. The number of fourth parity bits is equal to $N_{CW2} \cdot L_{LDPC2} \cdot (1-R_{high})$. where $N_{CW2}$ is the second codeword number, $L_{LDPC2}$ is the second codeword length, and $R_{high}$ is the second encoding rate.

Optionally, the third condition may be represented as the following formula (21):

$$N_{punc2} > 0.3 \cdot N_{CW2} \cdot N_{LDPC2} \cdot (1 - R_{high}) \tag{21}$$

where $N_{punc2}$ is the number of first parity bits, the first value is 0.3, and $N_{CW2} \cdot L_{LDPC2} \cdot (1-R_{high})$ is the number of fourth parity bits.

The fourth condition includes: the number of first parity bits is greater than a product of the second value and the number of fourth parity bits, and a ratio of the number of second shortened bits to the number of fourth parity bits is less than a product of the first weight factor and the fourth threshold.

The second value is greater than or equal to a third threshold. For example, the third threshold is 0.1. The fourth threshold is determined based on the second encoding rate.

The number of second shortened bits is the number of shortened bits included in a codeword corresponding to the second codeword number of the encoding apparatus at the second encoding rate. In a possible implementation, with reference to the foregoing formula (3), it can be learned that the number of second shortened bits $N_{shrt2} = \max(0, (N_{CW2} \times L_{LDPC2} \times R_{high}) - N_{pld1})$.

Optionally, the fourth condition may be represented as the following formula (22) and formula (23):

$$N_{punc2} > 0.1 \cdot N_{CW2} \cdot N_{LDPC2} \cdot (1 - R_{high}) \tag{22}$$

$$\frac{N_{shrt2}}{N_{punc2}} < 1.2 \cdot \frac{R_{high}}{(1 - R_{high})} \tag{23}$$

In the foregoing formula (22) and formula (23), $N_{punc2}$ is the number of first parity bits, $N_{CW2} \cdot L_{LDPC2} \cdot (1-R_{high})$ is the number of fourth parity bits, the second value is 0.1, the first weight factor is 1.2, and the fourth threshold is $$\frac{R_{high}}{(1 - R_{high})}.$$

Although the encoding apparatus supports the first encoding rate, in a process in which the encoding apparatus determines whether an extra symbol segment is required to resolve a problem of puncturing excess parity bits, the encoding apparatus should perform determining by using related parameters (for example, the number of first parity bits, the number of fourth parity bits, and the number of second shortened bits) corresponding to the second encoding rate, so that an effective bit rate is always less than or equal to the second encoding rate, thereby improving decoding performance.

Implementation 2: If a fifth condition and/or a sixth condition are/is met, the encoding apparatus determines to add an LDPC extra symbol segment.

The fifth condition includes: the number of second parity bits is greater than a product of a third value and the number of third parity bits. The third value is greater than 0.3.

The sixth condition includes: the number of second parity bits is greater than a product of a fourth value and the number of third parity bits, and a ratio of the number of second shortened bits to the number of first parity bits is less than a product of the first weight factor and the fourth threshold. The fourth value is greater than 0.1, and the fourth threshold is determined based on the second encoding rate.

For the number of second parity bits, the number of third parity bits, and the first shortened bits, refer to the foregoing related descriptions. Optionally, the fifth condition may be represented as the following formula (25), and the sixth condition may be represented as the following formula (26) and formula (27).

$$N_{punc} > a \cdot N_{CW1} \cdot N_{LDPC_1} \cdot (1 - R_{low}) \quad (25)$$

$$N_{punc1} > b \cdot N_{CW_1} \cdot N_{LDPC_1} \cdot (1 - R_{low}) \quad (26)$$

$$\frac{N_{shrt2}}{N_{punc2}} < 1.2 \cdot \frac{R_{high}}{(1 - R_{high})} \quad (27)$$

After the encoding apparatus determines to add an LDPC extra symbol segment, the encoding apparatus may add LDPC symbol segments. Corresponding symbol segments can be added by referring to the process shown in the foregoing formula (13) or formula (14), to avoid puncturing of excess parity bits, so as to ensure LDPC encoding performance and decoding accuracy on a decoding apparatus side.

505: The encoding apparatus generates a PPDU based on the encoded bit sequence, and outputs the PPDU to the decoding apparatus. Correspondingly, the decoding apparatus receives the PPDU from the encoding apparatus.

The PPDU carries an encoded bit sequence. The encoding apparatus sends the PPDU to the decoding apparatus, where the PPDU carries the encoded bit sequence. The decoding apparatus receives the PPDU.

506: The decoding apparatus decodes the encoded bit sequence based on the second codeword number and the second codeword length, to obtain decoded data bits.

Specifically, the decoding apparatus parses the PPDU to determine the number of first payload bits. Then, the decoding apparatus determines the first available bits based on the number of first payload bits and the first encoding rate. The decoding apparatus determines the second codeword number and the second codeword length based on the first available bits and the first correspondence. A process in which the decoding apparatus determines the first available bits are similar to that in step 502, and a process in which the decoding apparatus determines the second codeword number and the second codeword length is similar to that in step 502. For details, refer to related descriptions in step 502 and step 503. Details are not described herein again. The decoding apparatus decodes the encoded bit sequence based on the second codeword number and the second codeword length, to obtain decoded data bits. Specifically, the decoding apparatus may determine, based on the second codeword number and the second codeword length, the number of data bits in each codeword and the number of parity bits in each codeword in the codeword corresponding to the second codeword number. Then, the decoding apparatus reads the data bits in each codeword and the parity bits in each codeword, to obtain decoded data bits and decoded parity bits.

Optionally, based on implementation 1 of the repeat bits in the first codeword in step 504, if the number of first parity bits is 0, the repeat bits in the first codeword are repeated starting from a start bit of data bits in the first codeword. The decoding apparatus may read the repeat bits in the first codeword, and parse the data bits in the first codeword by using the repeat bits in the first codeword as a reference. This helps the decoding apparatus parse the data bits in the first codeword, thereby improving decoding accuracy of the decoding apparatus and improving decoding performance.

Optionally, based on implementation 2 of the repeat bits in the first codeword in step 504, if the number of first parity bits is 0, the repeat bits in the first codeword are repeated starting from a start bit of default parity bits in the first codeword. When neither a first condition nor a second condition is met, the repeat bits in the first codeword are repeated starting from a start bit of data bits in the first codeword. It can be learned that the decoding apparatus may read the repeat bits in the first codeword, determine which bits in the repeat bits in the first codeword are the copied default parity bits and which bits are the copied data bits in the first codeword, and parse the data bits in the first codeword by referring to these bit pairs. This helps the decoding apparatus parse the data bits in the first codeword, thereby improving decoding accuracy of the decoding apparatus and improving decoding performance.

Optionally, the decoding apparatus may parse out a value of an LDPC Extra Symbol Segment subfield in a common information field in the trigger frame, to determine whether an LDPC extra symbol segment is added. Alternatively, the decoding apparatus may determine, in the manner in which the encoding apparatus determines to add an LDPC extra symbol segment in step 504, whether an LDPC extra symbol segment is added.

Figure 8:
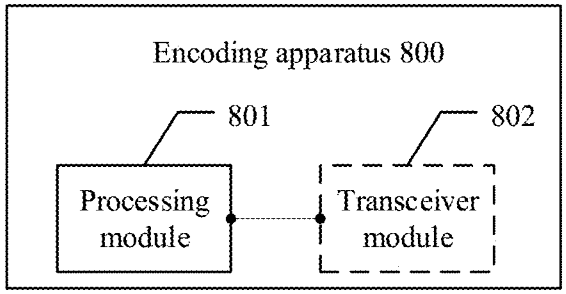
FIG. 8 is a schematic diagram of a structure of an encoding apparatus according to an embodiment of this application.

The following describes an encoding apparatus provided in an embodiment of this application. FIG. 8 is a schematic diagram of a structure of an encoding apparatus according to an embodiment of this application. The encoding apparatus 800 may be configured to perform the steps performed by the encoding apparatus in the embodiment shown in FIG. 5. For details, refer to related descriptions in the foregoing method embodiment.

The encoding apparatus 800 includes a processing module 801. Optionally, the encoding apparatus 800 further includes a transceiver module 802. The processing module 801 is configured to perform data processing. The transceiver module 802 may implement a corresponding communication function, and the transceiver module 802 may also be referred to as a communication interface or a communication unit.

Optionally, the encoding apparatus 800 may further include a storage unit. The storage unit may be configured to store instructions and/or data. The processing module 801 may read the instructions and/or the data in the storage unit, so that the encoding apparatus 800 implements the foregoing method embodiment.

The encoding apparatus 800 may be configured to perform the actions performed by the encoding apparatus in the foregoing method embodiments. The encoding apparatus 800 may be the encoding apparatus in the foregoing method embodiments or a component that can be disposed in the encoding apparatus. The transceiver module 802 is configured to perform a receiving-related operation on the encoding apparatus side in the foregoing method embodiment, and the processing module 801 is configured to perform a processing-related operation on the encoding apparatus side in the foregoing method embodiment.

Optionally, the transceiver module 802 may alternatively include a sending module and a receiving module. The sending module is configured to perform a sending operation in the foregoing method embodiment. The receiving module is configured to perform a receiving operation in the foregoing method embodiment.

It should be noted that the encoding apparatus 800 may include a sending module but not a receiving module. Alternatively, the encoding apparatus 800 may include a receiving module but not a sending module. Specifically, it may depend on whether the foregoing solution executed by the encoding apparatus 800 includes a sending action and a receiving action.

The processing module 801 is configured to: determine first payload bits, where the first payload bits are to-be-encoded data bits; determine first available bits based on the first payload bits and a first encoding rate; and determine a second codeword number and a second codeword length based on the first available bits and a first correspondence. The first correspondence is a correspondence between the first available bits, a first codeword number, and a first codeword length of the encoding apparatus 800 at the first encoding rate, the second codeword number is obtained based on the first codeword number, and the second codeword length is obtained based on the first codeword length.

In a possible implementation, that the second codeword number is obtained based on the first codeword number includes: the second codeword number is equal to the first codeword number. In this possible implementation, the second codeword number is the first codeword number, so that the encoding apparatus 800 determines, based on the first correspondence, a codeword number corresponding to a high bit rate.

In another possible implementation, the processing module 801 is specifically configured to:

determine, from the first correspondence, the first codeword number and the first codeword length that correspond to the first available bits;

use the first codeword number as the second codeword number; and update the first codeword length to obtain the second codeword length.

In another possible implementation, the second codeword length is:

$$L_{LDPC2} = L_{LDPC1} - N_{punc\_per\_cw\_default}$$

where $L_{LDPC2}$ is the second codeword length, $L_{LDPC1}$ is the first codeword length, and $N_{punc\_per\_cw\_default}$ is a number of default parity bits that need to be punctured in a codeword by the encoding apparatus 800 at a second encoding rate.

In another possible implementation, the second codeword length is:

$$L_{LDPC2} = L_{LDPC1} - N_{punc\_per\_cw\_default} - N_{short\_per\_cw\_default}$$

where $L_{LDPC2}$ is the second codeword length, $L_{LDPC1}$ is the first codeword length, $N_{punc\_per\_cw\_default}$ is a number of default parity bits that need to be punctured in a codeword by the encoding apparatus 800 at a second encoding rate, and $N_{short\_per\_cw\_default}$ is a number of default shortened bits required by the encoding apparatus 800 for a codeword at the second encoding rate.

In another possible implementation, the second codeword number is a codeword number of the encoding apparatus 800 at a second encoding rate, and the second codeword length is a codeword length of the encoding apparatus 800 at the second encoding rate.

In another possible implementation, the first encoding rate is less than the second encoding rate.

In another possible implementation, the first payload bits are bits in a PSDU and a service field that are not encoded; or the first payload bits are bits in a PSDU, a service field, and pre-forward error correction padding bits that are not encoded.

In another possible implementation, a number of first available bits is $$N_{avbits,middle} = \frac{N_{pld1}}{R_{low}},$$

where $N_{pld1}$ is a number of first payload bits, and $R_{low}$ is the first encoding rate.

In another possible implementation, the processing module 801 is specifically configured to:

determine the first available bits based on the first payload bits, the first encoding rate, and a first ratio, where the first ratio is a ratio of a number of first information bits to a number of second information bits, the first information bits are information bits corresponding to a codeword of the encoding apparatus 800 at the second encoding rate, and the second information bits are information bits corresponding to a codeword of the encoding apparatus 800 at the first encoding rate; and the number of first information bits is equal to the number of second information bits minus the number of default shortened bits required by a codeword.

In another possible implementation, a number of first available bits is $$N_{avbits,middle} = \frac{N_{pld1}}{r_{pld}R_{low}},$$

where $N_{pld1}$ is a number of first payload bits, $R_{low}$ is the first encoding rate, and $r_{pld}$ is the first ratio.

In another possible implementation, the processing module 801 is further configured to:

encode the first payload bits based on the second codeword number and the second codeword length, to obtain an encoded bit sequence; and generate a PPDU based on an encoded bit sequence.

The encoding apparatus 800 further includes a transceiver module 802.

The transceiver module 802 is configured to output the PPDU to a decoding apparatus.

In another possible implementation, the first payload bits include data bits in the first codeword; and the processing module 801 is specifically configured to:

if a number of first parity bits is 0, determine repeat bits in the first codeword, where the repeat bits in the first codeword are repeated starting from a start bit of data bits in the first codeword, and the number of first parity bits is determined based on the second codeword number, the second codeword length, and the first payload bits.

In another possible implementation, the first payload bits include data bits in the first codeword; and the processing module 801 is specifically configured to:

if a number of first parity bits is 0, determine repeat bits in the first codeword, where the repeat bits in the first codeword are repeated starting from a start bit of default parity bits in the first codeword, and the number of first parity bits is determined based on the second codeword number, the second codeword length, and the first payload bits; and when neither a first condition nor a second condition is met, the repeat bits in the first codeword are repeated starting from a start bit of data bits in the first codeword, where the first condition includes: a number of second parity bits is greater than a product of a first value and a number of third parity bits, and the first value is greater than or equal to a first threshold, where the number of second parity bits is a number of parity bits that need to be punctured in a codeword corresponding to the first codeword number of the encoding apparatus 800 at the first encoding rate, and the number of third parity bits is a number of parity bits included in the codeword corresponding to the first codeword number of the encoding apparatus 800 at the first encoding rate; and the second condition includes: the number of second parity bits is greater than a product of a second value and the number of third parity bits, and a ratio of a number of first shortened bits to the number of second parity bits is less than a product of a first weight factor and a second threshold, where the second value is greater than or equal to a third threshold, the second threshold is determined based on the first encoding rate, and the number of first shortened bits is a number of shortened bits included in the codeword corresponding to the first codeword number of the encoding apparatus 800 at the first encoding rate.

In another possible implementation, the number of first parity bits is $N_{punc2}=\max(0, (N_{CW2}\times L_{LDPC2})-N_{avbits,real}-N_{shrt2})$, where $N_{CW2}$ is the second codeword number, $L_{LDPC2}$ is the second codeword length, $N_{avbits,real}$ is a number of available bits of the encoding apparatus 800 at the second encoding rate, and $N_{shrt2}$ is a number of shortened bits included in a codeword corresponding to the second codeword number of the encoding apparatus 800 at the second encoding rate.

In another possible implementation, the processing module 801 is specifically configured to:

if a third condition and/or a fourth condition are/is met, determine to add an LDPC extra symbol segment, where the third condition includes: a number of first parity bits is greater than a product of a first value and a number of fourth parity bits, where the first value is greater than or equal to a first threshold, the number of first parity bits is determined based on the second codeword number, the second codeword length, and the first payload bits, the number of fourth parity bits is a number of parity bits included in a codeword corresponding to the second codeword number of the encoding apparatus 800 at the second encoding rate; and the fourth condition includes: the number of first parity bits is greater than a product of a second value and the number of fourth parity bits, and a ratio of a number of second shortened bits to the number of first parity bits is less than a product of a first weight factor and a fourth threshold, where the second value is greater than or equal to a third threshold, the number of second shortened bits is a number of shortened bits included in the codeword corresponding to the second codeword number of the encoding apparatus 800 at the second encoding rate, and the fourth threshold is determined based on the second encoding rate.

In another possible implementation, the processing module 801 is specifically configured to:

if a fifth condition and/or a sixth condition are/is met, determine to add an LDPC extra symbol segment, where the fifth condition includes: a number of second parity bits is greater than a product of a third value and a number of third parity bits, where the third value is greater than 0.3, the number of second parity bits is a number of parity bits that need to be punctured in a codeword corresponding to the first codeword number of the encoding apparatus 800 at the first encoding rate, and the number of third parity bits is a number of parity bits included in the codeword corresponding to the first codeword number of the encoding apparatus 800 at the first encoding rate; and the sixth condition includes: the number of second parity bits is greater than a product of a fourth value and the number of third parity bits, a ratio of a number of second shortened bits to a number of first parity bits is less than a product of a first weight factor and a fourth threshold, the fourth value is greater than 0.1, the number of first parity bits is determined based on the second codeword number, the second codeword length, and the first payload bits, the number of second shortened bits is a number of shortened bits included in a codeword corresponding to the second codeword number of the encoding apparatus 800 at the second encoding rate, and the fourth threshold is determined based on the second encoding rate.

Figure 9:
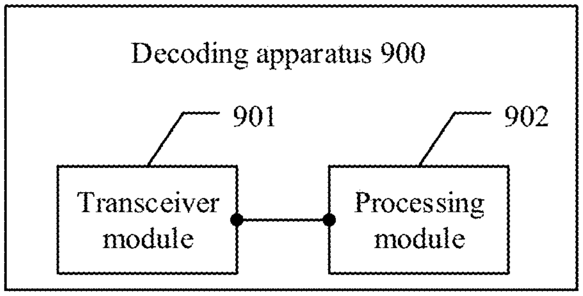
FIG. 9 is a schematic diagram of a structure of a decoding apparatus according to an embodiment of this application.

The following describes a decoding apparatus provided in an embodiment of this application. FIG. 9 is a schematic diagram of a structure of a decoding apparatus according to an embodiment of this application. The decoding apparatus 900 may be configured to perform the steps performed by the decoding apparatus in the embodiment shown in FIG. 5. For details, refer to related descriptions in the foregoing method embodiment.

The decoding apparatus 900 includes a transceiver module 901 and a processing module 902. The processing module 902 is configured to perform data processing. The transceiver module 901 may implement a corresponding communication function, and the transceiver module 901 may also be referred to as a communication interface or a communication unit.

Optionally, the decoding apparatus 900 may further include a storage unit. The storage unit may be configured to store instructions and/or data. The processing module 902 may read the instructions and/or data in the storage unit, so that the decoding apparatus 900 implements the foregoing method embodiment.

The decoding apparatus 900 may be configured to perform the actions performed by the decoding apparatus in the foregoing method embodiments. The decoding apparatus 900 may be the decoding apparatus in the foregoing method embodiments or a component that can be configured in the decoding apparatus. The transceiver module 901 is configured to perform a receiving-related operation on a decoding apparatus side in the foregoing method embodiment, and the processing module 902 is configured to perform a processing-related operation on a decoding apparatus side in the foregoing method embodiment.

Optionally, the transceiver module 901 may alternatively include a sending module and a receiving module. The sending module is configured to perform a sending operation in the foregoing method embodiment. The receiving module is configured to perform a receiving operation in the foregoing method embodiment.

It should be noted that the decoding apparatus 900 may include a sending module but not a receiving module. Alternatively, the decoding apparatus 900 may include a receiving module but not a sending module. Specifically, it may depend on whether the foregoing solution executed by the decoding apparatus 900 includes a sending action and a receiving action.

The transceiver module 901 is configured to receive a PPDU from an encoding apparatus, where the PPDU carries a bit sequence encoded by the encoding apparatus.

The processing module 902 is configured to decode, based on a second codeword number and a second codeword length, the bit sequence encoded by the encoding apparatus, to obtain decoded data bits, where the second codeword number and the second codeword length are determined based on first available bits and a first correspondence, the first correspondence is a correspondence between the first available bits, a first codeword number, and a first codeword length of the encoding apparatus at a first encoding rate, the first available bits are determined based on first payload bits and the first encoding rate, the first payload bits are data bits in the encoded bit sequence, the second codeword number is obtained based on the first codeword number, and the second codeword length is obtained based on the first codeword length.

In a possible implementation, that the second codeword number is obtained based on the first codeword number includes: the second codeword number is equal to the first codeword number.

In another possible implementation, that the second codeword length is obtained based on the first codeword length includes:

$$L_{LDPC2} = L_{LDPC1} - N_{punc\_per\_cw\_default}$$

where $L_{LDPC2}$ is the second codeword length, $L_{LDPC1}$ is the first codeword length, and $N_{punc\_per\_cw\_default}$ is a number of default parity bits that need to be punctured in a codeword by the encoding apparatus at a second encoding rate.

In another possible implementation, that the second codeword length is obtained based on the first codeword length includes:

$$L_{LDPC2} = L_{LDPC1} - N_{punc\_per\_cw\_default} - N_{short\_per\_cw\_default}$$

where $L_{LDPC2}$ is the second codeword length, $L_{LDPC1}$ is the first codeword length, $N_{punc\_per\_cw\_default}$ is a number of default parity bits that need to be punctured in a codeword by the encoding apparatus at a second encoding rate, and $N_{short\_per\_cw\_default}$ is a number of default shortened bits required by a codeword of the encoding apparatus at the second encoding rate.

In another possible implementation, the second codeword number is a codeword number of the encoding apparatus at a second encoding rate, and the second codeword length is a codeword length of the encoding apparatus at the second encoding rate.

In another possible implementation, the first encoding rate is less than the second encoding rate.

In another possible implementation, the first payload bits are bits in a PSDU and a service field that are not encoded; or the first payload bits are bits in a PSDU, a service field, and pre-forward error correction padding bits that are not encoded.

In another possible implementation, a number of first available bits is $$N_{avbits,middle} = \frac{N_{pld1}}{R_{low}},$$

where $N_{pld1}$ is a number of first payload bits, and $R_{low}$ is the first encoding rate.

In another possible implementation, a number of first available bits is $$N_{avbits,middle} = \frac{N_{pld1}}{r_{pld} R_{low}},$$

where $N_{pld1}$ is a number of first payload bits, $R_{low}$ is the first encoding rate, $r_{pld}$ is a first ratio, the first ratio is a ratio of a number of first information bits to a number of second information bits, the first information bits are information bits corresponding to a codeword of the encoding apparatus at the second encoding rate, the second information bits are information bits corresponding to a codeword of the encoding apparatus at the first encoding rate, and the number of first information bits is equal to the number of second information bits minus the number of default shortened bits required by a codeword.

In another possible implementation, the first payload bits include data bits in the first codeword, and the encoded bit sequence includes repeat bits in the first codeword; and if a number of first parity bits is 0, the repeat bits in the first codeword are repeated starting from a start bit of data bits in the first codeword, and the first parity bits are determined based on the second codeword number, the second codeword length, and the first payload bits.

In another possible implementation, the first payload bits include data bits in the first codeword, and the encoded bit sequence includes repeat bits in the first codeword; and if a number of first parity bits is 0, the repeat bits in the first codeword are repeated starting from a start bit of default parity bits in the first codeword, and the first parity bits are determined based on the second codeword number, the second codeword length, and the first payload bits.

When neither a first condition nor a second condition is met, the repeat bits in the first codeword are repeated starting from a start bit of data bits in the first codeword, where the first condition includes: a number of second parity bits is greater than a product of a first value and a number of third parity bits, and the first value is greater than or equal to a first threshold, where the number of second parity bits is a number of parity bits that need to be punctured in a codeword corresponding to the first codeword number of the encoding apparatus at the first encoding rate, and the number of third parity bits is a number of parity bits included in the codeword corresponding to the first codeword number of the encoding apparatus at the first encoding rate; and the second condition includes: the number of second parity bits is greater than a product of a second value and the number of third parity bits, and a ratio of a number of first shortened bits to the number of second parity bits is less than a product of a first weight factor and a second threshold, where the second value is greater than or equal to a third threshold, the second threshold is determined based on the first encoding rate, and the number of first shortened bits is a number of shortened bits included in the codeword corresponding to the first codeword number of the encoding apparatus at the first encoding rate.

In another possible implementation, the number of first parity bits is $N_{punc2}=\max(0, (N_{CW2}\times L_{LDPC2})-N_{avbits,real}-N_{shrt2})$, where $N_{CW2}$ is the second codeword number, $L_{LDPC2}$ is the second codeword length, $N_{avbits,real}$ is a number of available bits of the encoding apparatus at the second encoding rate, and $N_{shrt2}$ is a number of shortened bits included in a codeword corresponding to the second codeword number of the encoding apparatus at the second encoding rate.

Figure 10:
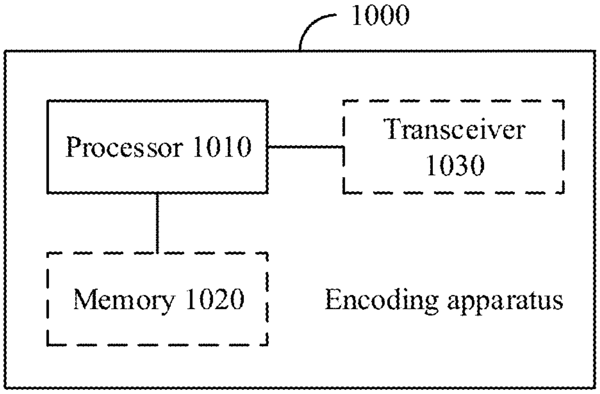
FIG. 10 is another schematic diagram of a structure of an encoding apparatus according to an embodiment of this application.

An embodiment of this application further provides an encoding apparatus 1000. FIG. 10 is another schematic diagram of a structure of an encoding apparatus according to an embodiment of this application. Refer to FIG. 10. The encoding apparatus 1000 includes a processor 1010. The processor 1010 is coupled to a memory 1020. The memory 1020 is configured to store a computer program or instructions and/or data. The processor 1010 is configured to execute the computer program or the instructions and/or the data stored in the memory 1020, so that the method in the foregoing method embodiment is performed.

Optionally, the encoding apparatus 1000 includes one or more processors 1010.

Optionally, as shown in FIG. 10, the encoding apparatus 1000 may further include the memory 1020.

Optionally, the encoding apparatus 1000 may include one or more memories 1020.

Optionally, the memory 1020 may be integrated with the processor 1010, or may be separately disposed.

Optionally, as shown in FIG. 10, the encoding apparatus 1000 may further include a transceiver 1030, where the transceiver 1030 is configured to receive and/or send a signal. For example, the processor 1010 is configured to control the transceiver 1030 to receive and/or send the signal.

Optionally, the encoding apparatus 1000 is configured to implement the operations performed by the encoding apparatus in the foregoing method embodiments.

For example, the processor 1010 is configured to perform processing-related operations performed by the encoding apparatus in the foregoing method embodiments, and the transceiver 1030 is configured to perform receiving/sending-related operations performed by the encoding apparatus in the foregoing method embodiments.

Figure 11:
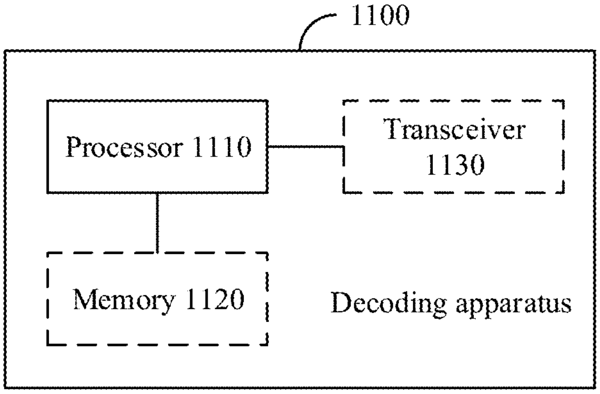
FIG. 11 is another schematic diagram of a structure of a decoding apparatus according to an embodiment of this application.

An embodiment of this application further provides a decoding apparatus 1100. FIG. 11 is another schematic diagram of a structure of a decoding apparatus according to an embodiment of this application. Refer to FIG. 11. The decoding apparatus 1100 includes a processor 1110. The processor 1010 is coupled to a memory 1120. The memory 1120 is configured to store a computer program or instructions and/or data. The processor 1110 is configured to execute the computer program or the instructions and/or the data stored in the memory 1120, so that the method in the foregoing method embodiment is performed.

Optionally, the decoding apparatus 1100 includes one or more processors 1110.

Optionally, as shown in FIG. 11, the decoding apparatus 1100 may further include the memory 1120.

Optionally, the decoding apparatus 1100 may include one or more memories 1120.

Optionally, the memory 1120 may be integrated with the processor 1110, or may be separately disposed.

Optionally, as shown in FIG. 11, the decoding apparatus 1100 may further include a transceiver 1130. The transceiver 1130 is configured to receive and/or send a signal. For example, the processor 1110 is configured to control the transceiver 1130 to receive and/or send the signal.

Optionally, the decoding apparatus 1100 is configured to implement the operations performed by the decoding apparatus in the foregoing method embodiments.

For example, the processor 1110 is configured to implement processing-related operations performed by the decoding apparatus in the foregoing method embodiments, and the transceiver 1130 is configured to implement receiving/sending-related operations performed by the decoding apparatus in the foregoing method embodiments.

Figure 12:
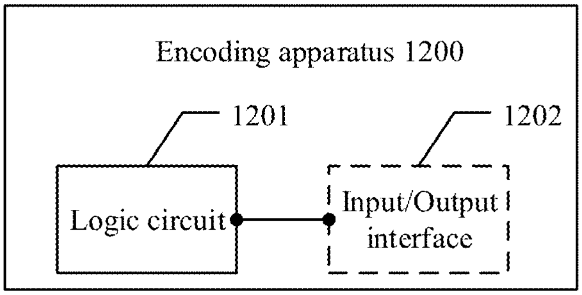
FIG. 12 is another schematic diagram of a structure of an encoding apparatus according to an embodiment of this application.

This application further provides an encoding apparatus. FIG. 12 is another schematic diagram of a structure of an encoding apparatus according to an embodiment of this application. Refer to FIG. 12. The encoding apparatus 1200 includes a logic circuit 1201. Optionally, the encoding apparatus 1200 further includes an input/output interface 1202. The encoding apparatus 1200 may be configured to perform the steps performed by the encoding apparatus in the embodiment shown in FIG. 5.

Optionally, the logic circuit 1201 may have a function of the processing module 801 in the embodiment shown in FIG. 8. The input/output interface 1202 may have a function of the transceiver module 802 in the embodiment shown in FIG. 8.

Optionally, the logic circuit 1201 may have a function of the processor 1010 in the embodiment shown in FIG. 10, and the logic circuit 1201 may be configured to perform the steps in the foregoing encoding method.

The encoding apparatus 1200 shown in FIG. 12 may perform the technical solution shown in the foregoing method embodiment. Implementation principles and beneficial effects are similar to those of the foregoing technical solution. Details are not described herein again.

Figure 13:
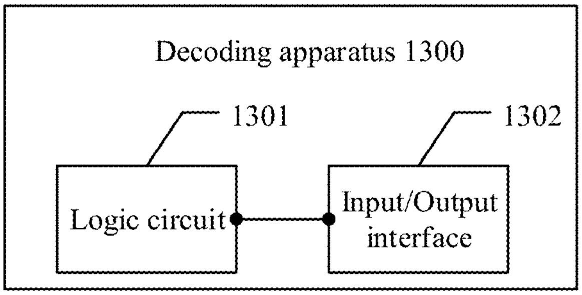
FIG. 13 is another schematic diagram of a structure of a decoding apparatus according to an embodiment of this application.

This application further provides a decoding apparatus. FIG. 13 is a schematic diagram of another structure of a decoding apparatus according to an embodiment of this application. Refer to FIG. 13. The decoding apparatus 1300 includes a logic circuit 1301 and an input/output interface 1302. The decoding apparatus 1300 may be configured to perform the steps performed by the decoding apparatus in the embodiment shown in FIG. 5.

Optionally, the logic circuit 1301 may have a function of the processing module 902 in the embodiment shown in FIG. 9. The input/output interface 1302 may have a function of the transceiver module 901 in the embodiment shown in FIG. 9.

Optionally, the logic circuit 1301 may have a function of the processor 1110 in the embodiment shown in FIG. 11, and the logic circuit 1301 may be configured to perform the steps in the foregoing encoding method.

The decoding apparatus 1300 shown in FIG. 13 may perform the technical solution shown in the foregoing method embodiment. Implementation principles and beneficial effects are similar to those of the foregoing technical solution. Details are not described herein again.

An embodiment of this application further provides a communication system. The communication system includes the encoding apparatus shown in FIG. 8 and the decoding apparatus shown in FIG. 9. The encoding apparatus is configured to perform all or some of the steps performed by the encoding apparatus in the embodiment shown in FIG. 5. The decoding apparatus is configured to perform all or some of the steps performed by the decoding apparatus in the embodiment shown in FIG. 5.

An embodiment of this application further provides a computer program product including instructions. When the computer program product runs on a computer, the computer is enabled to perform the method in the embodiment shown in FIG. 5.

An embodiment of this application further provides a computer-readable storage medium, including computer instructions. When the computer instructions are run on a computer, the computer is enabled to perform the method in the embodiment shown in FIG. 5.

An embodiment of this application further provides a chip apparatus, including a processor, configured to connect to a memory and invoke a program stored in the memory, so that the processor performs the method in the embodiment shown in FIG. 5.

Any one of the foregoing processors may be a general-purpose central processing unit, a microprocessor, an application-specific integrated circuit (ASIC), or one or more integrated circuits for controlling program execution of the method in the embodiment shown in FIG. 5. Any one of the foregoing memories may be a read-only memory (ROM), another type of static storage device that can store static information and instructions, a random access memory (RAM), or the like.

In this application, unless otherwise specified, for identical or similar parts in embodiments, reference may be made to each other. In embodiments of this application and the implementations/implementation methods in embodiments, unless otherwise specified or a logical conflict occurs, terms and/or descriptions are consistent and may be mutually referenced between different embodiments and between the implementations/implementation methods in embodiments. Technical features in the different embodiments and the implementations/implementation methods in embodiments may be combined to form a new embodiment, implementation, or implementation method based on an internal logical relationship thereof. The following implementations of this application are not intended to limit the protection scope of this application.

It may be understood that "an embodiment" mentioned in the entire specification means that particular features, structures, or characteristics related to the embodiment are included in at least one embodiment of this application. Therefore, embodiments in the entire specification do not necessarily refer to a same embodiment. In addition, these particular features, structures, or characteristics may be combined in one or more embodiments in any appropriate manner. It may be understood that sequence numbers of processes do not mean execution sequences in various embodiments of this application. The execution sequences of the processes should be determined based on functions and internal logic of the processes, and should not be construed as any limitation on implementation processes of embodiments of this application.

It may be understood that, in some scenarios, some optional features in embodiments of this application may be independently implemented without depending on another feature, for example, a solution on which the optional features are currently based, to resolve a corresponding technical problem and achieve a corresponding effect. Alternatively, in some scenarios, the optional features may be combined with other features based on requirements. Correspondingly, the apparatus provided in embodiments of this application may also correspondingly implement these features or functions. Details are not described herein.

It may be clearly understood by a person skilled in the art that, for convenient and brief description, for a detailed working process of the foregoing system, apparatus, and unit, reference may be made to a corresponding process in the foregoing method embodiments. Details are not described herein again.

In the several embodiments provided in this application, it should be understood that the disclosed systems, apparatuses, and methods may be implemented in other manners. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, and may be located in one position, or may be distributed on a plurality of network units. Some or all of the units may be selected depending on actual requirements to achieve the objectives of the solutions in the embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this application essentially, or the part contributing to conventional technologies, or all or some of the technical solutions may be implemented in a form of a software product. The computer software product is stored in a storage medium and includes several instructions for enabling a computer device (which may be a personal computer, a server, or a network device) to perform all or some of the steps of the methods described in embodiments of this application. The foregoing storage medium includes: any medium that can store program code, a USB flash drive, a removable hard disk, a read-only memory (read-only memory, ROM), a random access memory (random access memory, RAM), a magnetic disk, an optical disc, and the like.

What is claimed is:

1. An encoding apparatus comprising at least one processor and at least one memory coupled to the at least one processor, wherein the at least one memory stores programming instructions for execution by the at least one processor that, when upon being executed, cause the encoding apparatus to:

determine first payload bits that are to-be-encoded data bits;

determine first available bits based on the first payload bits and a first encoding rate; and determine a second codeword number and a second codeword length based on the first available bits and a first correspondence, wherein the first correspondence is a correspondence among the first available bits, a first codeword number and a first codeword length of the encoding apparatus at the first encoding rate, wherein the second codeword number is obtained based on the first codeword number, and wherein the second codeword length is obtained based on the first codeword length.

2. The encoding apparatus according to claim 1, wherein obtaining the second codeword number based on the first codeword number comprises the second codeword number equaling to the first codeword number.

3. The encoding apparatus according to claim 1, wherein determining the second codeword number and the second codeword length based on the first available bits and the first correspondence comprises:

determining, from the first correspondence, the first codeword number and the first codeword length that associated with the first available bits;

using the first codeword number as the second codeword number; and updating the first codeword length to obtain the second codeword length.

4. The encoding apparatus according to claim 3, wherein updating the first codeword length to obtain the second codeword length comprises:

$$L_{LDPC2} = L_{LDPC1} - N_{punc\_per\_cw\_default}$$

wherein $L_{LDPC2}$ is the second codeword length, $L_{LDPC1}$ is the first codeword length, and $N_{punc\_per\_cw\_default}$ is a number of default parity bits that need to be punctured in a codeword by the encoding apparatus at a second encoding rate.

5. The encoding apparatus according to claim 3, wherein updating the first codeword length to obtain the second codeword length comprises:

$$L_{LDPC2} = L_{LDPC1} - N_{punc\_per\_cw\_default} - N_{short\_per\_cw\_default}$$

wherein $L_{LDPC2}$ is the second codeword length, $L_{LDPC1}$ is the first codeword length, $N_{punc\_per\_cw\_default}$ is a number of default parity bits that need to be punctured in a codeword by the encoding apparatus at a second encoding rate, and $N_{short\_per\_cw\_default}$ is a number of default shortened bits required by a codeword of the encoding apparatus at the second encoding rate.

6. The encoding apparatus according to claim 1, wherein the second codeword number is a codeword number of the encoding apparatus at a second encoding rate, and the second codeword length is a codeword length of the encoding apparatus at the second encoding rate.

7. The encoding apparatus according to claim 6, wherein the first encoding rate is less than the second encoding rate.

8. The encoding apparatus according to claim 1, wherein the first payload bits are bits in a physical layer service data unit (PSDU) and a first service field that are not encoded; or the first payload bits are bits in the PSDU, a second service field and pre-forward error correction padding bits that are not encoded.

9. The encoding apparatus according to claim 1, wherein a number of first available bits is $$N_{avbits,middle} = \frac{N_{pld1}}{R_{low}},$$

wherein $N_{pld1}$ is a number of first payload bits, and $R_{low}$ is the first encoding rate.

10. A decoding apparatus comprises at least one processor and at least one memory coupled to the at least one processor, wherein the at least one memory stores programming instructions for execution by the at least one processor that, when upon being executed, cause the decoding apparatus to:

receive a physical layer protocol data unit (PPDU) from an encoding apparatus, wherein the PPDU carries a bit sequence encoded by the encoding apparatus; and decode, based on a second codeword number and a second codeword length, the bit sequence encoded by the encoding apparatus, to obtain decoded data bits, wherein the second codeword number and the second codeword length are determined based on first available bits and a first correspondence, wherein the first correspondence is a correspondence among the first available bits, a first codeword number, and a first codeword length of the encoding apparatus at a first encoding rate, wherein the first available bits are determined based on first payload bits and the first encoding rate, wherein the first payload bits are data bits in the encoded bit sequence, wherein the second codeword number is obtained based on the first codeword number, and wherein the second codeword length is obtained based on the first codeword length.

11. The decoding apparatus according to claim 10, wherein obtaining the second codeword number based on the first codeword number comprises the second codeword number equaling to the first codeword number.

12. The decoding apparatus according to claim 10, wherein obtaining the second codeword length based on the first codeword length comprises:

$$L_{LDPC2} = L_{LDPC1} - N_{punc\_per\_cw\_default}$$

wherein $L_{LDPC2}$ is the second codeword length, $L_{LDPC1}$ is the first codeword length, and $N_{punc\_per\_cw\_default}$ is a number of default parity bits that need to be punctured in a codeword by the encoding apparatus at a second encoding rate.

13. The decoding apparatus according to claim 10, wherein obtaining the second codeword length based on the first codeword length comprises:

$$L_{LDPC2}=L_{LDPC1}-N_{punc\_per\_cw\_default}-N_{short\_per\_cw\_default}$$

wherein $L_{LDPC2}$ is the second codeword length, $L_{LDPC1}$ is the first codeword length, $N_{punc\_per\_cw\_default}$ is a number of default parity bits that need to be punctured in a codeword by the encoding apparatus at a second encoding rate, and $N_{short\_per\_cw\_default}$ is a number of default shortened bits required by a codeword of the encoding apparatus at the second encoding rate.

14. The decoding apparatus according to claim 10, wherein the second codeword number is a codeword number of the encoding apparatus at a second encoding rate, and wherein the second codeword length is a codeword length of the encoding apparatus at the second encoding rate.

15. The decoding apparatus according to claim 14, wherein the first encoding rate is less than the second encoding rate.

16. The decoding apparatus according to claim 10, wherein the first payload bits are bits in a physical layer service data unit (PSDU) and a first service field that are not encoded; or the first payload bits are bits in the PSDU, a second service field and pre-forward error correction padding bits that are not encoded.

17. The decoding apparatus according to claim 10, wherein a number of first available bits is $$N_{avbits,middle}=\frac{N_{pld1}}{R_{low}},$$

wherein $N_{pld1}$ is a number of first payload bits, and wherein $R_{low}$ is the first encoding rate.

18. The decoding apparatus according to claim 10, wherein a number of first available bits is $$N_{avbits,middle}=\frac{N_{pld1}}{r_{pld}R_{low}},$$

wherein $N_{pld1}$ is a number of first payload bits, wherein $R_{low}$ is the first encoding rate, wherein $r_{pld}$ is a first ratio, wherein the first ratio is a ratio of a number of first information bits to a number of second information bits, wherein the first information bits are information bits associated with a codeword of the encoding apparatus at the second encoding rate, wherein the second information bits are information bits associated with a codeword of the encoding apparatus at the first encoding rate, and wherein the number of first information bits is equal to the number of second information bits minus the number of default shortened bits required by a codeword.

19. An encoding method comprising:

determining, by an encoding apparatus, first payload bits that are to-be-encoded data bits;

determining, by the encoding apparatus, first available bits based on the first payload bits and a first encoding rate; and determining, by the encoding apparatus, a second codeword number and a second codeword length based on the first available bits and a first correspondence, wherein the first correspondence is a correspondence among the first available bits, a first codeword number and a first codeword length of the encoding apparatus at the first encoding rate, wherein the second codeword number is obtained based on the first codeword number, and wherein the second codeword length is obtained based on the first codeword length.

20. The method according to claim 19, wherein obtaining the second codeword number based on the first codeword number comprises the second codeword number equaling to the first codeword number.

* * * * *